United States Patent
Watfa et al.

(10) Patent No.: US 9,426,698 B2
(45) Date of Patent: *Aug. 23, 2016

(54) METHOD AND APPARATUS FOR TRANSMITTING EXTENDED SERVICE REQUEST MESSAGES IN A CONGESTED NETWORK

(71) Applicant: InterDigital Patent Holdings, Inc., Wilmington, DE (US)

(72) Inventors: Mahmoud Watfa, Saint-Leonard (CA); Behrouz Aghili, Commack, NY (US); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/632,562

(22) Filed: Feb. 26, 2015

(65) Prior Publication Data

US 2015/0172962 A1 Jun. 18, 2015

Related U.S. Application Data

(63) Continuation of application No. 13/153,863, filed on Jun. 6, 2011, now Pat. No. 9,001,655.

(60) Provisional application No. 61/484,115, filed on May 9, 2011, provisional application No. 61/359,063, filed on Jun. 28, 2010, provisional application No. 61/354,979, filed on Jun. 15, 2010, provisional application No. 61/352,096, filed on Jun. 7, 2010.

(51) Int. Cl.
*H04L 12/26* (2006.01)
*H04W 36/00* (2009.01)
(Continued)

(52) U.S. Cl.
CPC ............ *H04W 36/0022* (2013.01); *H04W 4/22* (2013.01); *H04W 28/0289* (2013.01); *H04W 48/06* (2013.01); *H04W 28/02* (2013.01)

(58) Field of Classification Search
CPC ...................................................... H04L 47/10
USPC .......................................................... 370/235
See application file for complete search history.

(56) References Cited

U.S. PATENT DOCUMENTS

| 6,356,755 B1 | 3/2002 | Valentine et al. |
| 2007/0032219 A1 | 2/2007 | Rudolf et al. |

(Continued)

FOREIGN PATENT DOCUMENTS

| CN | 101035360 | 9/2007 |
| EP | 0 978 953 | 2/2000 |

(Continued)

OTHER PUBLICATIONS

Fujitsu et al., "Mobile Terminated Emergency Call with CSFB feature," 3GPP TSG SA Plenary Meeting #45, SP-090577, Seville, Spain Sep. 21-24, 2009).

(Continued)

*Primary Examiner* — Christopher R Crompton
(74) *Attorney, Agent, or Firm* — Volpe and Koenig, P.C.

(57) ABSTRACT

Methods and apparatus for transmitting extended service request messages in a congested network are described. An apparatus includes a timer, a receiver and a processor. The receiver receives a message that includes a timer value. The processor sets the timer based on the timer value, activates the timer, and attempts mobile-originated circuit switched fallback for an emergency call during a period that corresponds to the timer value and during which mobile-originated circuit switched fallback is otherwise prohibited.

13 Claims, 13 Drawing Sheets

(51) Int. Cl.
*H04W 48/06* (2009.01)
*H04W 4/22* (2009.01)
*H04W 28/02* (2009.01)

(56) References Cited

U.S. PATENT DOCUMENTS

| | | |
|---|---|---|
| 2007/0213060 A1 | 9/2007 | Shaheen |
| 2008/0102784 A1 | 5/2008 | Mittal et al. |
| 2008/0186862 A1 | 8/2008 | Corbett et al. |
| 2009/0111428 A1 | 4/2009 | Blommaert et al. |
| 2009/0238143 A1 | 9/2009 | Mukherjee et al. |
| 2010/0184448 A1 | 7/2010 | Wu |
| 2010/0208624 A1 | 8/2010 | Vikberg et al. |
| 2010/0279648 A1 | 11/2010 | Song et al. |
| 2010/0297979 A1 | 11/2010 | Watfa et al. |
| 2010/0317394 A1 | 12/2010 | Harris et al. |
| 2011/0201342 A1 | 8/2011 | Wong et al. |
| 2011/0280217 A1 | 11/2011 | Drevon et al. |
| 2012/0015646 A1 | 1/2012 | Burbidge et al. |
| 2012/0269099 A1* | 10/2012 | Chin ............ H04W 4/22 370/259 |
| 2012/0315907 A1* | 12/2012 | Chin ............ H04W 36/22 455/436 |

FOREIGN PATENT DOCUMENTS

| | | |
|---|---|---|
| EP | 1 993 314 | 11/2008 |
| JP | 3040319 | 8/1997 |
| JP | 2003-296890 | 10/2003 |
| WO | 01/72080 | 9/2001 |
| WO | 2010/054358 | 5/2010 |
| WO | 2012115995 A1 | 8/2012 |

OTHER PUBLICATIONS

Qualcomm Europe, "Extended service request CSFB emergency call during access class barring," 3GPP TSG CT WG1 Meeting #59, C1-092451, Los Angeles, USA (Jun. 22-26, 2009).
Ericsson et al., "Back off Timer for Low Priority Access," 3GPP TSG SA WG2 Meeting #79, S2-102224, Kyoto, Japan (May 10-14, 2010).
Interdigital LLC, "Allowing the UE to send a request for emergency call when the timer T3442 is running," 3GPP TSG-CT WG1 Meeting #65, C1-102755 (Jun. 28-Jul. 2, 2010).
Interdigital LLC, "Stopping of timer T3442," 3GPP TSG-CT WG1 Meeting #65, C1-102357 (Jun. 28-Jul. 2, 2010).
Third Generation Partnership Project, "Technical Specification Group Services and System Aspects; Circuit Switched (CS) fallback in Evolved Packet System (EPS); Stage 2 (Release 10)," 3GPP TS 23.272 V10.3.1 (Apr. 2011).
Third Generation Partnership Project, "Technical Specification Group Core Network and Terminals; Mobility Management Entity (MME)—Visitor Location Register (VLR) SGs interface specification (Release 10)," 3GPP TS 29.118 V10.3.0 (Mar. 2011).
Third Generation Partnership Project, "Technical Specification Group Core Network and Terminals; Non-Access-Stratum (NAS) protocol for Evolved Packet System (EPS); Stage 3 (Release 10)," 3GPP TS 24.301 V10.2.0 (Mar. 2011).
Third Generation Partnership Project, "Technical Specification Group Services and System Aspects; Circuit Switched (CS) Fallback in Evolved Packet System (EPS); Stage 2 (Release 8)," 3GPP TS 23.272 V8.7.0 (Mar. 2010).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.2.0 (Mar. 2010).
Third Generation Partnership Project, "Technical Specification Group Services and System Aspects; Circuit Switched (CS) fallback in Evolved Packet System (EPS); Stage 2 (Release 9)," 3GPP TS 23.272 V9.3.0 (Mar. 2010).
Third Generation Partnership Project, "Technical Specification Group Services and System Aspects; Circuit Switched (CS) fallback in Evolved Packet System (EPS); Stage 2 (Release 9)," 3GPP TS 23.272 V9.7.0 (Mar. 2011).
Third Generation Partnership Project, "Technical Specification Group Core Network and Terminals; Non-Access-Stratum (NAS) protocol for Evolved Packet System (EPS); Stage 3 (Release 9)," 3GPP TS 24.301 V9.6.0 (Mar. 2011).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.9.0 (Mar. 2011).
Third Generation Partnership Project, "Technical Specification Group Core Network and Terminals; Mobility Management Entity (MME)—Visitor Location Register (VLR) SGs interface specification (Release 8)," 3GPP TS 29.118 V8.5.0 (Mar. 2010).
Third Generation Partnership Project, "Technical Specification Group Services and System Aspects; Circuit Switched (CS) fallback in Evolved Packet System (EPS); Stage 2 (Release 8)," 3GPP TS 23.272 V8.10.0 (Dec. 2010).
Third Generation Partnership Project, "Technical Specification Group Core Network and Terminals; Mobility Management Entity (MME)—Visitor Location Register (VLR) SGs interface specification (Release 8)," GPP TS 29.118 V8.8.0 (Dec. 2010).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V8.5.0 (Mar. 2010).
Third Generation Partnership Project, "Technical Specification Group Core Network and Terminals; Mobility Management Entity (MME)—Visitor Location Register (VLR) SGs interface specification (Release 9)," 3GPP TS 29.118 V9.4.0 (Dec. 2010).
Third Generation Partnership Project, "Technical Specification Group Core Network and Terminals; Mobility Management Entity (MME)—Visitor Location Register (VLR) SGs interface specification (Release 9)," 3GPP TS 29.118 V9.1.0 (Mar. 2010).
Third Generation Partnership Project, "Technical Specification Group GSM/EDGE Radio Access Network; Mobile radio interface layer 3 specification; Radio Resource Control (RRC) protocol (Release 10)," 3GPP TS 44.018 V10.2.0 (Mar. 2011).
Third Generation Partnership Project, "Technical Specification Group GSM/EDGE Radio Access Network; Mobile radio interface layer 3 specification; Radio Resource Control (RRC) protocol (Release 8)," 3GPP TS 44.018 V8.12.0 (Sep. 2010).
Third Generation Partnership Project, "Technical Specification Group GSM/EDGE Radio Access Network; Mobile radio interface layer 3 specification; Radio Resource Control (RRC) protocol (Release 7)," 3GPP TS 44.018 V7.19.1 (Apr. 2010).
Third Generation Partnership Project, "Technical Specification Group GSM/EDGE Radio Access Network; Mobile radio interface layer 3 specification; Radio Resource Control (RRC) protocol (Release 8)," 3GPP TS 44.018 V8.10.0 (Mar. 2010).
Third Generation Partnership Project, "Technical Specification Group GSM/EDGE Radio Access Network; Mobile radio interface layer 3 specification; Radio Resource Control (RRC) protocol (Release 6)," 3GPP TS 44.018 V6.24.0 (Feb. 2009).
Third Generation Partnership Project, "Technical Specification Group GSM/EDGE Radio Access Network; Mobile radio interface layer 3 specification; Radio Resource Control (RRC) protocol (Release 9)," 3GPP TS 44.018 V9.8.0 (Mar. 2011).
Third Generation Partnership Project, "Technical Specification Group GSM/EDGE Radio Access Network; Mobile radio interface layer 3 specification; Radio Resource Control (RRC) protocol (Release 5)," 3GPP TS 44.018 V5.23.0 (Feb. 2009).
Third Generation Partnership Project, "Technical Specification Group GSM/EDGE Radio Access Network; Mobile radio interface layer 3 specification, Radio Resource Control (RRC) protocol (Release 4)," 3GPP TS 44.018 V4.23.0 (May 2006).
Third Generation Partnership Project, "Technical Specification Group GSM/EDGE Radio Access Network; Mobile radio interface layer 3 specification; Radio Resource Control (RRC) protocol (Release 9)," 3GPP TS 44.018 V9.4.0 (Mar. 2010).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).

(56) References Cited

OTHER PUBLICATIONS

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.9.0 (Mar. 2010).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.4.0 (Mar. 2010).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).

* cited by examiner

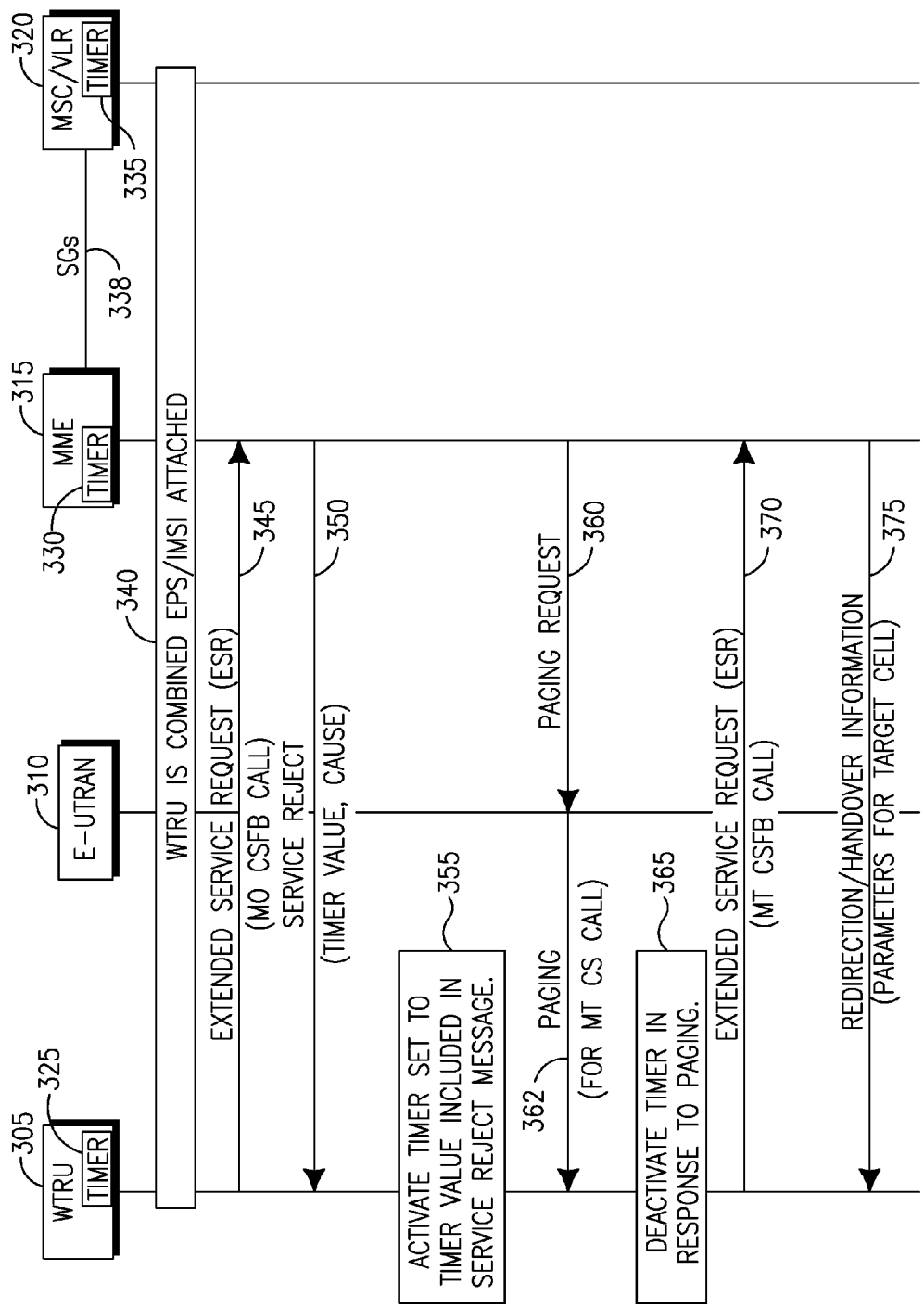

METHOD AND APPARATUS FOR TRANSMITTING EXTENDED SERVICE REQUEST MESSAGES IN A CONGESTED NETWORK

CROSS REFERENCE TO RELATED APPLICATIONS

This application continuation of U.S. patent application Ser. No. 13/153,863 filed Jun. 6, 2011, which claims the benefit of U.S. provisional application Nos. 61/484,115 filed May 9, 2011, 61/359,063 filed Jun. 28, 2010, 61/354,979 filed Jun. 15, 2010, and 61/352,096 filed Jun. 7, 2010, the contents of which are hereby incorporated by reference herein.

BACKGROUND

Circuit switched (CS) fallback (CSFB) in an evolved packet system (EPS) enables the provisioning of voice and other CS domain services when a wireless transmit/receive unit (WTRU) is served by an evolved universal terrestrial radio access network (E-UTRAN). FIG. 1A shows a conventional EPS architecture 100 including a CSFB-capable WTRU 105, an E-UTRAN 110, a mobility management entity (MME) 115, mobile switching center (MSC)/visitor location register (VLR) 120, a (GSM)/enhanced data rates for GSM evolution (EDGE) radio access network (GERAN) 125, a UTRAN 130 and a serving general packet radio service (GPRS) support node (SGSN) 135. The WTRU 105 may include at least one timer 140. The MME 115 communicates with the MSC/VLR 120 via an SGs interface 145. CSFB and Internet protocol (IP) multimedia subsystem (IMS)-based services, such as a short messaging service (SMS), may coexist in the conventional EPS architecture 100. The CSFB-capable WTRU 105 may use the GERAN 130 or the UTRAN 125 to connect to the CS domain, and use the E-UTRAN 110 to connect to a packet switched (PS) domain (e.g., a long term evolution (LTE) network), for providing IMS voice services. The conventional EPS architecture 100 of FIG. 1A enables the WTRU 105 to use the PS domain to receive CS services, such as SMS, as well as place a CS call. However, other services, such as CS voice and location services, require that the CS domain be used for the purpose of actual exchange of voice or location service data. In order for the WTRU 105 to have access to both the PS and CS domains, the WTRU 105 performs a combined EPS/international mobile subscriber identity (IMSI) registration procedure.

FIG. 1B is a signal flow diagram of a CSFB call establishment procedure performed in the conventional EPS architecture 100 of FIG. 1A. When the WTRU 105 is registered to both the PS and CS domains after sending an attach message or a tracking area update (TAU) message, the WTRU 105 may be combined EPS/IMSI attached (150). The WTRU 105 may initiate a CSFB request procedure by sending a mobile originated (MO) CSFB extended service request (ESR) message to the MME 115 (155) and activating a timer 140, (i.e., T3417ext), in the WTRU 105 (160). The timer 140 may be set to a predetermined time period, (e.g., 10 seconds) to implement the CSFB request procedure. If the CSFB request procedure succeeds, the timer 140 is deactivated prior to expiration (162), (e.g., set to a value of zero). Otherwise, the WTRU waits for the timer 140 to expire on a condition that the CSFB request procedure is aborted (164). The problem with the CSFB call establishment procedure of FIG. 1B is that the amount of time that the WTRU 105 has to waste waiting to find out that the CSFB request procedure has failed is unacceptable. If the CSFB request procedure fails, a user of the WTRU 105 ends up having to send another ESR message (166) or take alternative action, which wastes time.

FIG. 1C is a signal flow diagram of a CSFB call establishment procedure performed in the conventional EPS architecture 100, whereby access to the CS domain is temporarily restricted due to congestion or the implementation of an operator policy. When the WTRU 105 is registered to both the PS and CS domains after sending an attach or TAU message, the WTRU 105 is combined EPS/IMSI attached (170). The WTRU 105 may initiate a CSFB request procedure by sending an MO CSFB ESR message (175) to the MME 115. Due to the temporarily restricted access to the CS domain, the MME 115 may send a service reject message (180) to the WTRU 105 to indicate, using a cause value, (e.g., #39), that the CS domain will temporarily not be available for a predetermined period of time, as defined by a timer value in the service reject message. The timer 140, (i.e., T3442), in the WTRU 105 may be set to the timer value included in the service reject message and activated (182). The WTRU 105 has to wait for the timer 140 to expire (184) before being able to send another ESR message (186).

However, as shown in FIG. 1D, the MSC/VLR 120 may receive a mobile terminated (MT) call request for the WTRU 105, and request the MME 115 to notify the WTRU 105. The MME 115 may send a paging request (190) to the E-UTRAN 110 to page the WTRU 105 (192) for an MT CS call. The WTRU 105 may respond to the page with an ESR message for an MT CSFB call (194). However, the timer 140 continues running until it expires, thus indicating that the CS domain is congested, even though that may no longer be the case. The MME 115 may then send redirection/handover information, (e.g., parameters for a target cell), to the WTRU 115 (196).

The problem with the CSFB call establishment procedures of FIGS. 1B, 1C and 1D is that there is no provision for expediting the handling of CSFB emergency calls when the CS domain is congested.

SUMMARY

A method and apparatus are described for transmitting circuit switched (CS) service request messages in a congested network. In one embodiment, a service reject message including a timer value may be received by a wireless transmit/receive unit (WTRU) having a timer that is set based on the timer value. Once the timer is activated, the WTRU may not attempt to transmit an extended service request (ESR) message to a network for mobile originated (MO) services, except for MO CS fallback for emergency calls, until the timer expires. In another embodiment, the timer may be deactivated in response to receiving a page for a mobile terminated (MT) CS call. The congested network may include a mobility management entity (MME) and a mobile switching center (MSC)/visitor location register (VLR). The MME may apply a congestion control criteria to the WTRU based on whether a timer in the MME is activated or expired.

BRIEF DESCRIPTION OF THE DRAWINGS

A more detailed understanding may be had from the following description, given by way of example in conjunction with the accompanying drawings wherein:

FIGS. 3-5 are signal flow diagrams of CSFB call establishment procedures in accordance with respective embodiments;

DETAILED DESCRIPTION

Figure 2A:
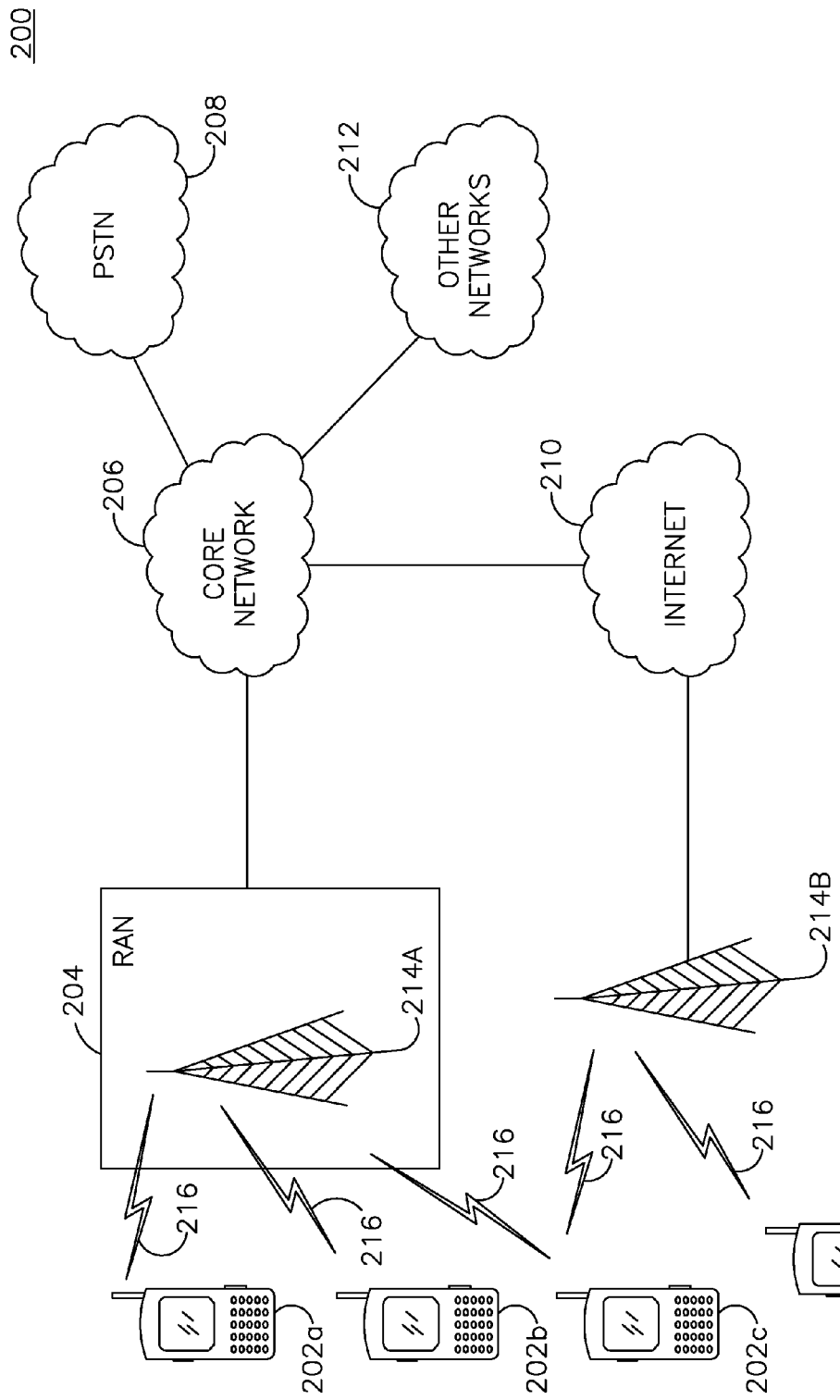
FIG. 2A shows an example communications system in which one or more disclosed embodiments may be implemented.

FIG. 2A shows an example communications system 200 in which one or more disclosed embodiments may be implemented. The communications system 200 may be a multiple access system that provides content, such as voice, data, video, messaging, broadcast, and the like, to multiple wireless users. The communications system 200 may enable multiple wireless users to access such content through the sharing of system resources, including wireless bandwidth. For example, the communications systems 200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 2A, the communications system 200 may include WTRUs 202a, 202b, 202c, 202d, a radio access network (RAN) 204, a core network 206, a public switched telephone network (PSTN) 208, the Internet 210, and other networks 212, though it will be appreciated that the disclosed embodiments contemplate any number of WTRUs, base stations, networks, and/or network elements. Each of the WTRUs 202a, 202b, 202c, 202d may be any type of device configured to operate and/or communicate in a wireless environment. By way of example, the WTRUs 202a, 202b, 202c, 202d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 200 may also include a base station 214a and a base station 214b. Each of the base stations 214a, 214b may be any type of device configured to wirelessly interface with at least one of the WTRUs 202a, 202b, 202c, 202d to facilitate access to one or more communication networks, such as the core network 206, the Internet 210, and/or the other networks 212. By way of example, the base stations 214a, 214b may be a base transceiver station (BTS), a Node-B, an evolved Node-B (eNB), a Home Node-B (HNB), a Home eNB (HeNB), a site controller, an access point (AP), a wireless router, and the like. While the base stations 214a, 214b are each depicted as a single element, it will be appreciated that the base stations 214a, 214b may include any number of interconnected base stations and/or network elements.

The base station 214a may be part of the RAN 204, which may also include other base stations and/or network elements (not shown), such as a base station controller (BSC), a radio network controller (RNC), relay nodes, and the like. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in one embodiment, the base station 214a may include three transceivers, i.e., one for each sector of the cell. In another embodiment, the base station 214a may employ multiple-input multiple-output (MIMO) technology and, therefore, may utilize multiple transceivers for each sector of the cell.

The base stations 214a, 214b may communicate with one or more of the WTRUs 202a, 202b, 202c, 202d over an air interface 216, which may be any suitable wireless communication link, (e.g., radio frequency (RF), microwave, infrared (IR), ultraviolet (UV), visible light, and the like). The air interface 216 may be established using any suitable radio access technology (RAT).

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 204 and the WTRUs 202a, 202b, 202c may implement a radio technology such as universal mobile telecommunications system (UMTS) terrestrial radio access (UTRA), which may establish the air interface 216 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 214a and the WTRUs 202a, 202b, 202c may implement a radio technology such as evolved UTRA (E-UTRA), which may establish the air interface 216 using long term evolution (LTE) and/or LTE-Advanced (LTE-A).

In other embodiments, the base station 214a and the WTRUs 202a, 202b, 202c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 214b in FIG. 2A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 214b and the WTRUs 202c, 202d may implement a radio technology such as IEEE 802.11 to establish a wireless local area network (WLAN). In another embodiment, the base station 214b and the WTRUs 202c, 202d may implement a radio technology such as IEEE 802.15 to establish a wireless personal area network (WPAN). In yet another embodiment, the base station 214b and the WTRUs 202c, 202d may utilize a cellular-based RAT, (e.g., WCDMA, CDMA2000, GSM, LTE, LTE-A, and the like), to establish a picocell or femtocell. As shown in FIG. 2A, the base station 214b may have a direct connection to the Internet 210. Thus, the base station 214b may not be required to access the Internet 210 via the core network 206.

The RAN 204 may be in communication with the core network 206, which may be any type of network configured to provide voice, data, applications, and/or voice over Internet protocol (VoIP) services to one or more of the WTRUs 202a, 202b, 202c, 202d. For example, the core network 206 may provide call control, billing services, mobile location-based services, pre-paid calling, Internet connectivity, video distribution, and the like, and/or perform high-level security functions, such as user authentication. Although not shown in FIG. 2A, it will be appreciated that the RAN 204 and/or the core network 206 may be in direct or indirect communication with other RANs that employ the same RAT as the RAN 204 or a different RAT. For example, in addition to being connected to the RAN 204, which may be utilizing an E-UTRA radio technology, the core network 206 may also be in communication with another RAN (not shown) employing a GSM radio technology.

The core network 206 may also serve as a gateway for the WTRUs 202a, 202b, 202c, 202d to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the Internet protocol (IP) in the TCP/IP suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 202a, 202b, 202c, 202d in the communications system 200 may include multi-mode capabilities, i.e., the WTRUs 202a, 202b, 202c, 202d may include multiple transceivers for communicating with different wireless networks over different wireless links. For example, the WTRU 202c shown in FIG. 2A may be configured to communicate with the base station 214a, which may employ a cellular-based radio technology, and with the base station 214b, which may employ an IEEE 802 radio technology.

Figure 2B:
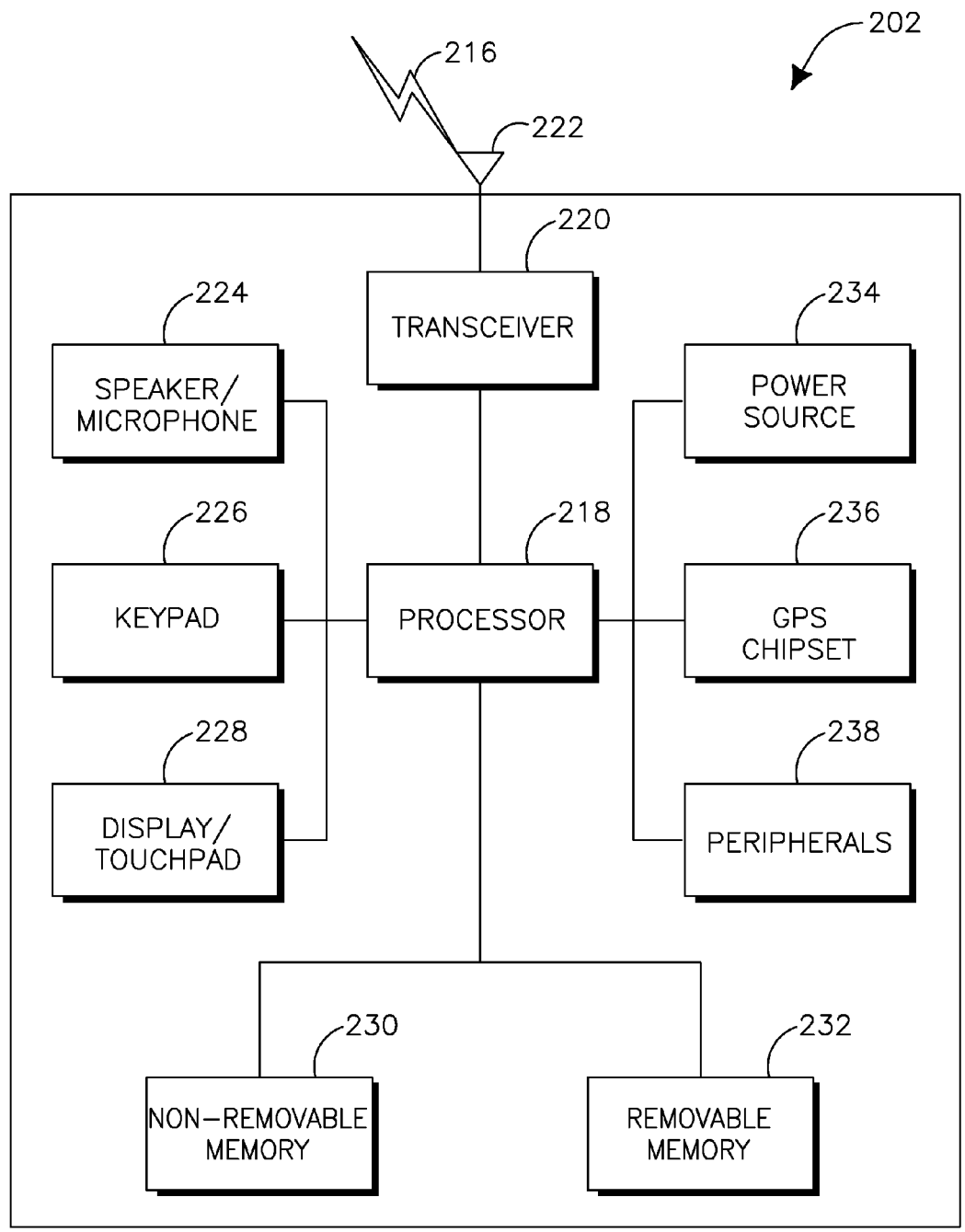
FIG. 2B shows an example wireless transmit/receive unit (WTRU) that may be used within the communications system shown in FIG. 2A.

FIG. 2B shows an example WTRU 202 that may be used within the communications system 200 shown in FIG. 2A. As shown in FIG. 2B, the WTRU 202 may include a processor 218, a transceiver 220, a transmit/receive element, (e.g., an antenna), 222, a speaker/microphone 224, a keypad 226, a display/touchpad 228, a non-removable memory 230, a removable memory 232, a power source 234, a global positioning system (GPS) chipset 236, and peripherals 238. It will be appreciated that the WTRU 202 may include any subcombination of the foregoing elements while remaining consistent with an embodiment.

The processor 218 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 218 may perform signal coding, data processing, power control, input/output processing, and/or any other functionality that enables the WTRU 202 to operate in a wireless environment. The processor 218 may be coupled to the transceiver 220, which may be coupled to the transmit/receive element 222. While FIG. 2B depicts the processor 218 and the transceiver 220 as separate components, the processor 218 and the transceiver 220 may be integrated together in an electronic package or chip.

The transmit/receive element 222 may be configured to transmit signals to, or receive signals from, a base station (e.g., the base station 214a) over the air interface 216. For example, in one embodiment, the transmit/receive element 222 may be an antenna configured to transmit and/or receive RF signals. In another embodiment, the transmit/receive element 222 may be an emitter/detector configured to transmit and/or receive IR, UV, or visible light signals, for example. In yet another embodiment, the transmit/receive element 222 may be configured to transmit and receive both RF and light signals. The transmit/receive element 222 may be configured to transmit and/or receive any combination of wireless signals.

In addition, although the transmit/receive element 222 is depicted in FIG. 2B as a single element, the WTRU 202 may include any number of transmit/receive elements 222. More specifically, the WTRU 202 may employ MIMO technology. Thus, in one embodiment, the WTRU 202 may include two or more transmit/receive elements 222, (e.g., multiple antennas), for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 202 may have multi-mode capabilities. Thus, the transceiver 220 may include multiple transceivers for enabling the WTRU 202 to communicate via multiple RATs, such as UTRA and IEEE 802.11, for example.

The processor 218 of the WTRU 202 may be coupled to, and may receive user input data from, the speaker/microphone 224, the keypad 226, and/or the display/touchpad 228 (e.g., a liquid crystal display (LCD) display unit or organic light-emitting diode (OLED) display unit). The processor 218 may also output user data to the speaker/microphone 224, the keypad 226, and/or the display/touchpad 228. In addition, the processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. In other embodiments, the processor 218 may access information from, and store data in, memory that is not physically located on the WTRU 202, such as on a server or a home computer (not shown).

The processor 218 may receive power from the power source 234, and may be configured to distribute and/or control the power to the other components in the WTRU 202. The power source 234 may be any suitable device for powering the WTRU 202. For example, the power source 234 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 218 may also be coupled to the GPS chipset 236, which may be configured to provide location information (e.g., longitude and latitude) regarding the current location of the WTRU 202. In addition to, or in lieu of, the information from the GPS chipset 236, the WTRU 202 may receive location information over the air interface 216 from a base station, (e.g., base stations 214*a*, 214*b*), and/or determine its location based on the timing of the signals being received from two or more nearby base stations. The WTRU 202 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 2C:
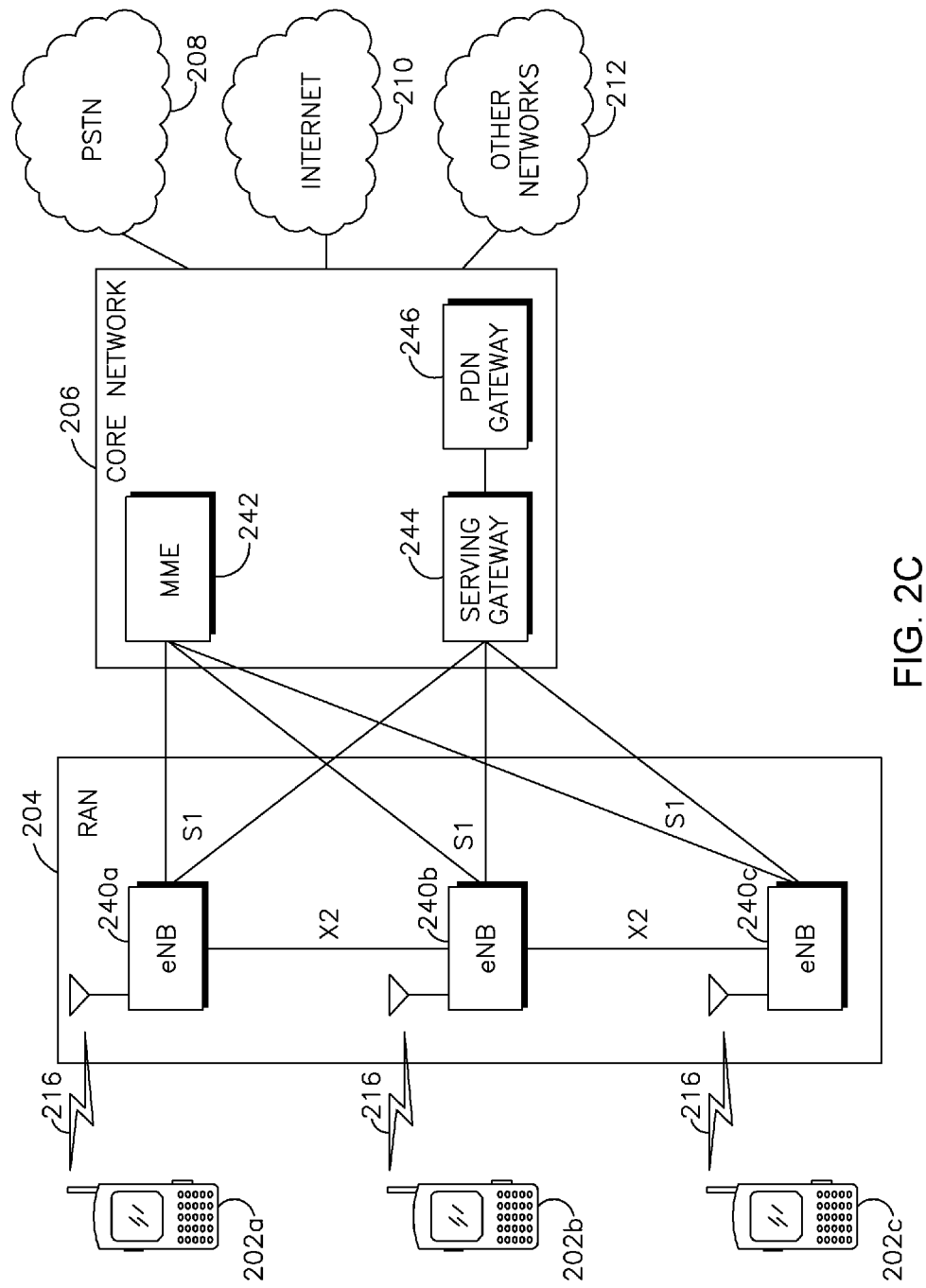
FIG. 2C shows an example radio access network and an example core network that may be used within the communications system shown in FIG. 2A.

FIG. 2C shows an example RAN 204 and an example core network 206 that may be used within the communications system 200 shown in FIG. 2A. As noted above, the RAN 204 may employ an E-UTRA radio technology to communicate with the WTRUs 202*a*, 202*b*, 202*c* over the air interface 216. The RAN 204 may also be in communication with the core network 206.

The RAN 204 may include eNBs 240*a*, 240*b*, 240*c*, though it will be appreciated that the RAN 204 may include any number of eNBs while remaining consistent with an embodiment. The eNBs 240*a*, 240*b*, 240*c* may each include one or more transceivers for communicating with the WTRUs 202*a*, 202*b*, 202*c* over the air interface 216. In one embodiment, the eNBs 240*a*, 240*b*, 240*c* may implement MIMO technology. Thus, the eNB 240*a*, for example, may use multiple antennas to transmit wireless signals to, and receive wireless signals from, the WTRU 202*a*.

Each of the eNBs 240*a*, 240*b*, 240*c* may be associated with a particular cell (not shown) and may be configured to handle radio resource management decisions, handover decisions, scheduling of users in the uplink and/or downlink, and the like. As shown in FIG. 2C, the eNBs 240*a*, 240*b*, 240*c* may communicate with one another over an X2 interface.

The core network 206 shown in FIG. 2C may include a mobility management entity (MME) 242, a serving gateway 244, and a packet data network (PDN) gateway 246. While each of the foregoing elements are depicted as part of the core network 206, it will be appreciated that any one of these elements may be owned and/or operated by an entity other than the core network operator.

The MME 242 may be connected to each of the eNBs 240*a*, 240*b*, 240*c* in the RAN 204 via an S1 interface and may serve as a control node. For example, the MME 242 may be responsible for authenticating users of the WTRUs 202*a*, 202*b*, 202*c*, bearer activation/deactivation, selecting a particular serving gateway during an initial attach of the WTRUs 202*a*, 202*b*, 202*c*, and the like. The MME 242 may also provide a control plane function for switching between the RAN 204 and other RANs (not shown) that employ other radio technologies, such as GSM or WCDMA.

The serving gateway 244 may be connected to each of the eNBs 240*a*, 240*b*, 240*c* in the RAN 204 via the S1 interface. The serving gateway 244 may generally route and forward user data packets to/from the WTRUs 202*a*, 202*b*, 202*c*. The serving gateway 244 may also perform other functions, such as anchoring user planes during inter-eNB handovers, triggering paging when downlink data is available for the WTRUs 202*a*, 202*b*, 202*c*, managing and storing contexts of the WTRUs 202*a*, 202*b*, 202*c*, and the like.

The serving gateway 244 may also be connected to the PDN gateway 246, which may provide the WTRUs 202*a*, 202*b*, 202*c* with access to packet-switched networks, such as the Internet 210, to facilitate communications between the WTRUs 202*a*, 202*b*, 202*c* and IP-enabled devices.

The core network 206 may facilitate communications with other networks. For example, the core network 206 may provide the WTRUs 202*a*, 202*b*, 202*c* with access to circuit-switched networks, such as the PSTN 208, to facilitate communications between the WTRUs 202*a*, 202*b*, 202*c* and traditional land-line communications devices. For example, the core network 206 may include, or may communicate with, an IP gateway, (e.g., an IP multimedia subsystem (IMS) server), that serves as an interface between the core network 206 and the PSTN 208. In addition, the core network 206 may provide the WTRUs 202*a*, 202*b*, 202*c* with access to the networks 212, which may include other wired or wireless networks that are owned and/or operated by other service providers.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "base station" includes but is not limited to a Node-B, a site controller, an access point (AP), or any other type of interfacing device capable of operating in a wireless environment.

FIG. 3 is a signal flow diagram of a CSFB call establishment procedure performed in a wireless communication system including a WTRU 305, an E-UTRAN 310, an MME 315 and an MSC/VLR 320 in accordance with a first embodiment, whereby access to the CS domain is temporarily restricted due to congestion or the implementation of an operator policy. The WTRU 305 may include at least one timer 325, (i.e., T3442), the MME 315 may include at least one timer 330 and the MSC/VLR 320 may include at least one timer 335. The MME 115 may communicate with the MSC/VLR 320 via an SGs interface 338. When the WTRU 305 is registered to both the PS and CS domains after sending an attach or TAU message, the WTRU 305 may be combined EPS/IMSI attached (340). The WTRU 305 may initiate a CSFB request procedure by sending an MO CSFB ESR message (345) to the MME 315. However, the MME 315 may temporarily apply CS congestion control for a predetermined period of time, as determined by the MSC/VLR 120. Due to the temporarily restricted access to the CS domain, the MME 315 may send a service reject message (350) to the WTRU 305 to indicate, using a cause value, (e.g., #39), that the CS domain may temporarily not be available for a predetermined period of time, as defined by a timer value in the service reject message. A timer 325, (i.e., T3442), in the WTRU 305 may be set to the timer value included in the service reject message and activated (355).

In accordance with the first embodiment of the CSFB call establishment procedure of FIG. 3, the MSC/VLR 320 may receive an MT call request for the WTRU 305, and request the MME 315 to notify the WTRU 305. The MME 315 may send a paging request (360) to the E-UTRAN 310 to page the WTRU 305 for an MT CS call (362). In this embodiment, the WTRU 305 does not have to wait for the timer 325 to expire before being able to send another ESR message if paging for an MT CS call is received (360). Instead, the timer 325 in the WTRU 305 may be deactivated in response to the paging (365) and an ESR message for an MT CSFB call may be sent immediately (370), rather than having to wait for the timer 325 to expire. The MME 115 may then send redirection/ handover information, (e.g., parameters for a target cell), to the WTRU 115 (375).

Still referring to FIG. 3, for the purpose of enabling/disabling requests for CS services, if the timer 325 is running in the WTRU 305, then the WTRU 305 may deactivate the timer 325 if it receives a paging message (radio resource control (RRC) message) indicating that the source of the paging (362) is the CS domain for the purpose of an MT CS call or other CS services, such as location services or supplementary services. In addition, the WTRU 305 may respond to the paging (362) by sending an ESR message as expected. On the other hand, if the WTRU 305 is in connected mode, (i.e., with at least a non-access stratum (NAS) signaling connection), when it receives a notification for an MT CS service, (e.g., CS call, location service, or supplementary service), the WTRU 305 may take similar actions, i.e., the WTRU 305 may stop the timer 325 and process the CS service notification message as usual, (i.e., as the case when the notification is received and the timer 325 is not running).

Alternatively, for the purpose of enabling/disabling requests for CS services, the WTRU 305 may be allowed to send an ESR if an MT CSFB request is received, (i.e., via paging or receiving a CS service notification message). However, the timer 325 may be deactivated on a condition that the ESR indicates that the MT CSFB is accepted. If the WTRU 305 was paged for MT CSFB, the WTRU may send an ESR message and the user does not have a choice to reject the request. Thus, this may be considered as accepting the MT CSFB request. Alternatively, the timer 325 may be deactivated when the MT CSFB request has been accepted and the CSFB procedure is started or has been successfully completed, (upon lower layer indications of successful inter-system change, or upon reception of a mobility message to perform an inter-system change). If the CSFB call establishment procedure is considered to have failed, the WTRU 305 may resume the timer 325 or reactivate it.

Alternatively, for the purpose of enabling/disabling requests for CS services, if the WTRU 305 receives a CS service notification message and the upper layers, (e.g., the user after being requested to accept/reject the call), indicate a rejection of the call, then an ESR message may be sent indicating rejection of the MT CSFB request. However, the WTRU 305 may keep the timer 325 running.

If the ESR message was sent because the WTRU 305 wants to place an emergency call, and the WTRU 305 receives a service reject with cause #39, the WTRU 305 may autonomously reselect to the CS domain to place the emergency call, (e.g., if the WTRU 305 does not support IMS emergency calls). Alternatively, congestion control may not be applied to MO CSFB requests for emergency calls, i.e., the MME 315 may always accept such requests even if the MME 315 is applying congestion control for CSFB calls. The WTRU 305 may be informed, (via signaling, e.g., NAS messages), or preconfigured, to send an MO CSFB for emergency calls, even if the timer 325 is running, and may wait for the network response before taking another action, e.g., autonomous reselection to the CS domain if request is rejected. Similarly, the WTRU 305 may be informed, (via signaling, e.g., NAS messages), or preconfigured, to perform reselection to the CS domain to place a CS emergency call when the timer 325 is running.

In a second embodiment, indications about the unavailability of the CS domain may be included in other NAS messages, e.g., in TAU accept messages, (possibly as a response to a periodic TAU request that is sent by the WTRU, i.e., even if the TAU request does not have an update type set to combined), for those WTRUs that are combined registered. In this way, the network does not have to wait for the WTRUs to send an ESR message in order to inform them about the unavailability, e.g., via the service reject message. Moreover, the WTRU may display a message to the user, e.g., to indicate the unavailability of CS domain.

In the second embodiment, a timer value, for setting the timer 325 in the WTRU 305, may be included in other NAS messages sent by the MME 315 or the E-UTRAN 310 to inform the WTRU 305 about the duration of the unavailability of the CS domain. The WTRU 305 may autonomously reselect to the CS domain in case an emergency call is requested and the WTRU 305 does not support IMS emergency calls. The indications about the unavailability of the CS domain may be in the form of a new information element (IE) or a new bit position in existing IEs, such as the EPS network feature support IE.

Furthermore, the network (E-UTRAN) may broadcast an indicator to signal availability or lack of availability of the CS domain. The indicator may be set to available or unavailable, (or any name that indicates availability status of the CS domain), depending on, e.g., a notification from the MME 315 to the E-UTRAN 310 that the CS domain is available or not available. This notification may be triggered by the reception of an indication of signaling availability by the MSC/VLR 320, a lack of availability of the CS domain as a result of a failure of the SGs interface 338, a failure or reset of the MSC/VLR 320, or any other form of congestion control. In addition, if the WTRU 305, while reading system information, notices a change in the CS domain availability status that indicates that the CS domain is now available, the WTRU 305 may deactivate the timer 325.

In some cases, when the WTRU 305 may receive a CS service notification with, e.g., caller line identification, the WTRU 305 may request the upper layers (e.g., the user) for input in order to accept or reject the call. The input from upper layers may not be received. Thus, if the timer 325 is running, the WTRU 305 may stop the timer 325 when it receives the CS service notification before (or regardless of) requesting upper layers for input to accept or reject the call. This may be applicable to the case when no upper layer's input is requested. Moreover, the WTRU 305 may now display to the user that the congestion control status, (or the CS domain availability status), has changed, (e.g., is available).

It may be indicated to the user that CSFB calls, (e.g., MO, or MT, or both, or other CS services such as SMS, supplementary service (SS) and location service (LCS)) are temporarily not allowed. This indication may be made whenever timer 325 is activated, and it may be removed when the timer is stopped or upon expiry.

Figure 1A:
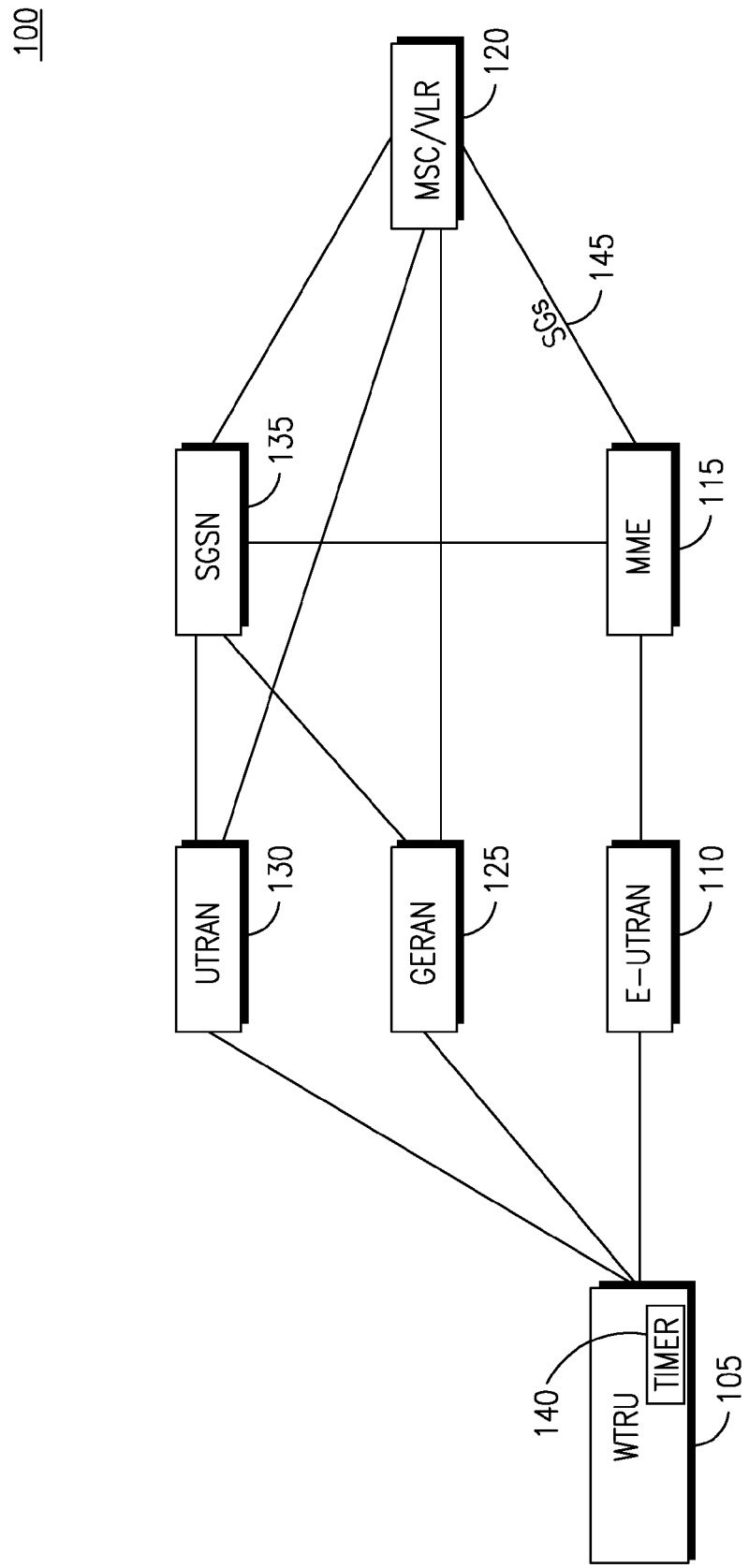
FIG. 1A shows a conventional EPS architecture 100.
Figure 1B:
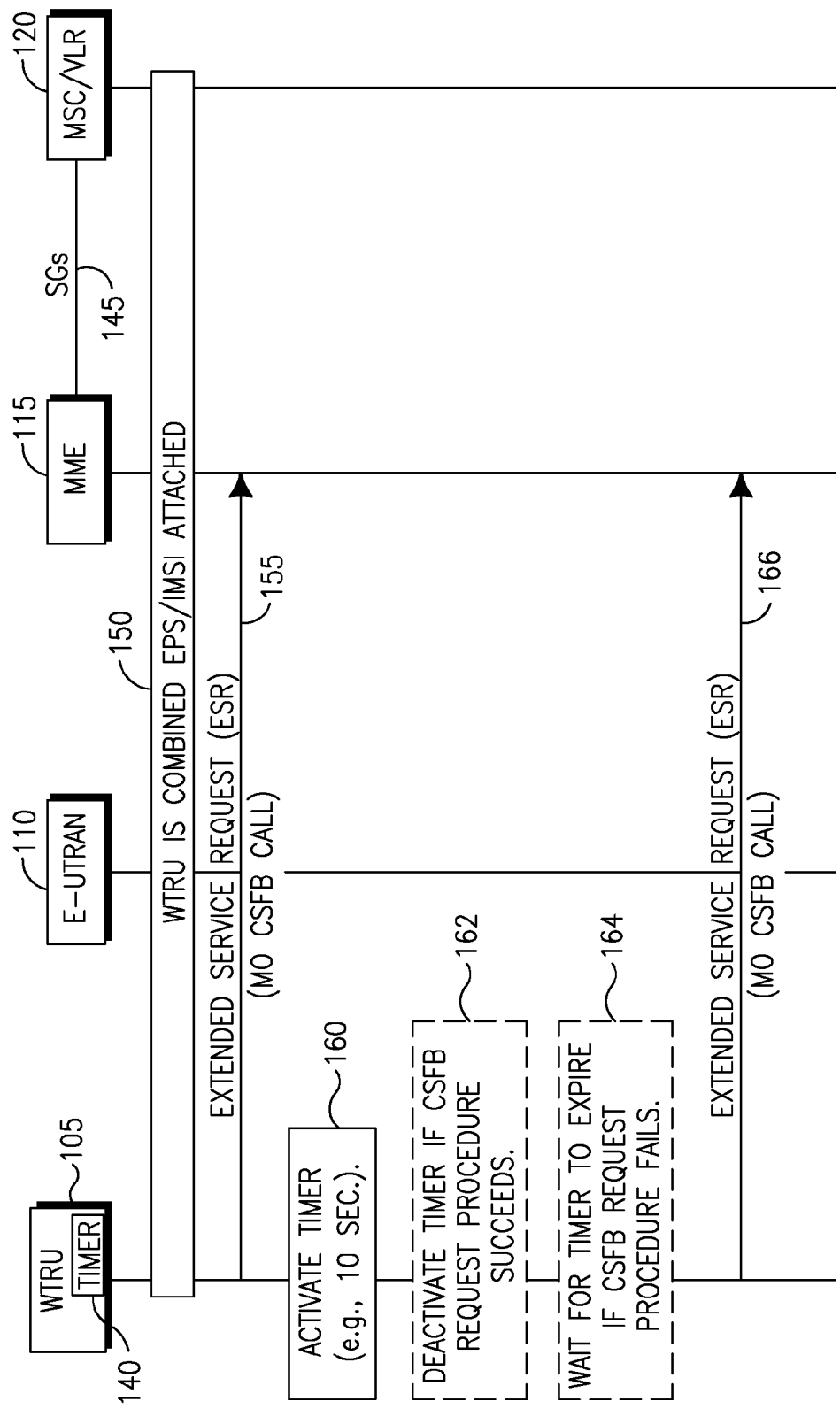
FIG. 1B-1D are signal flow diagrams of conventional CSFB call establishment procedures performed in the EPS architecture of FIG. 1A.
Figure 1C:
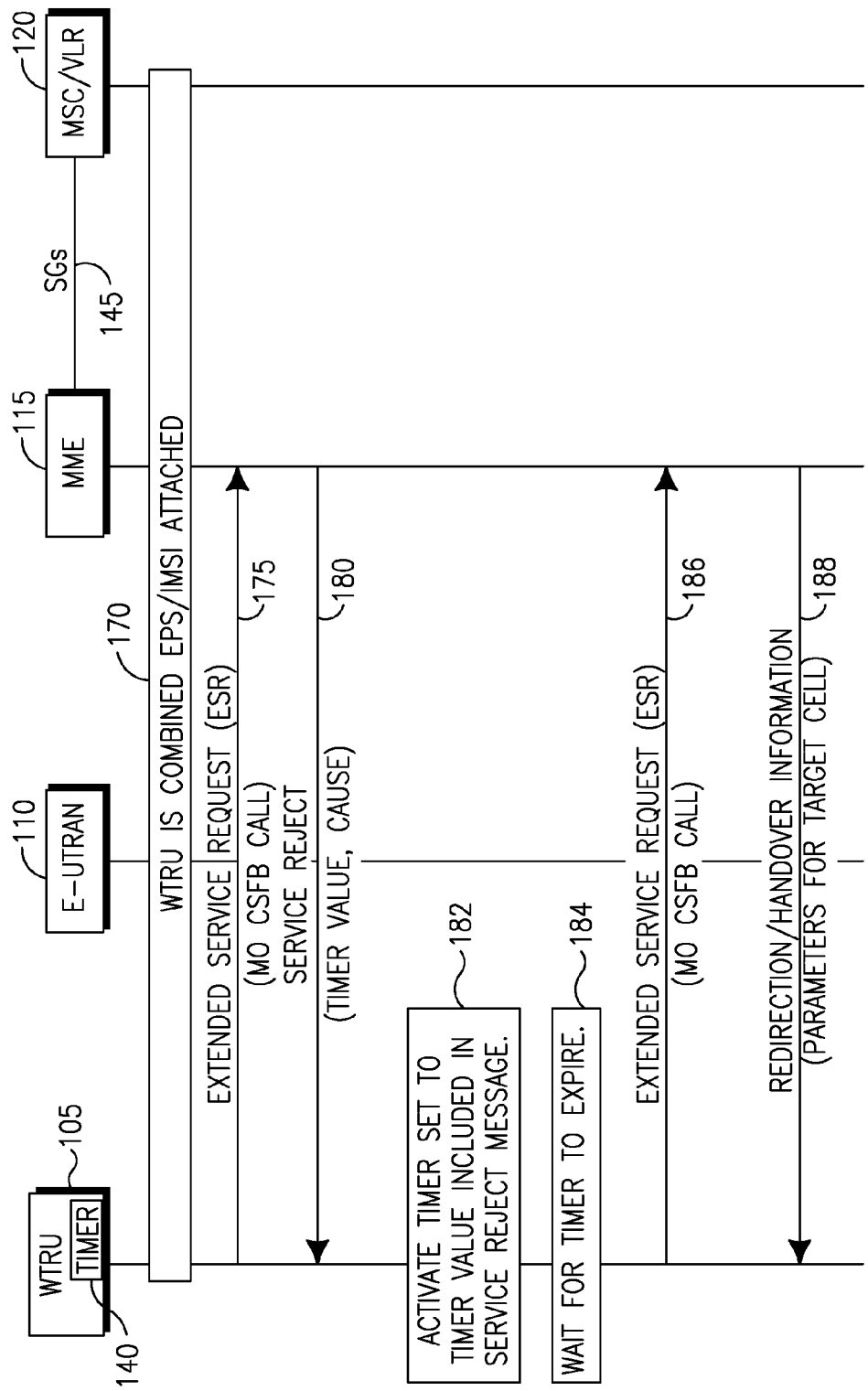
Figure 1D:
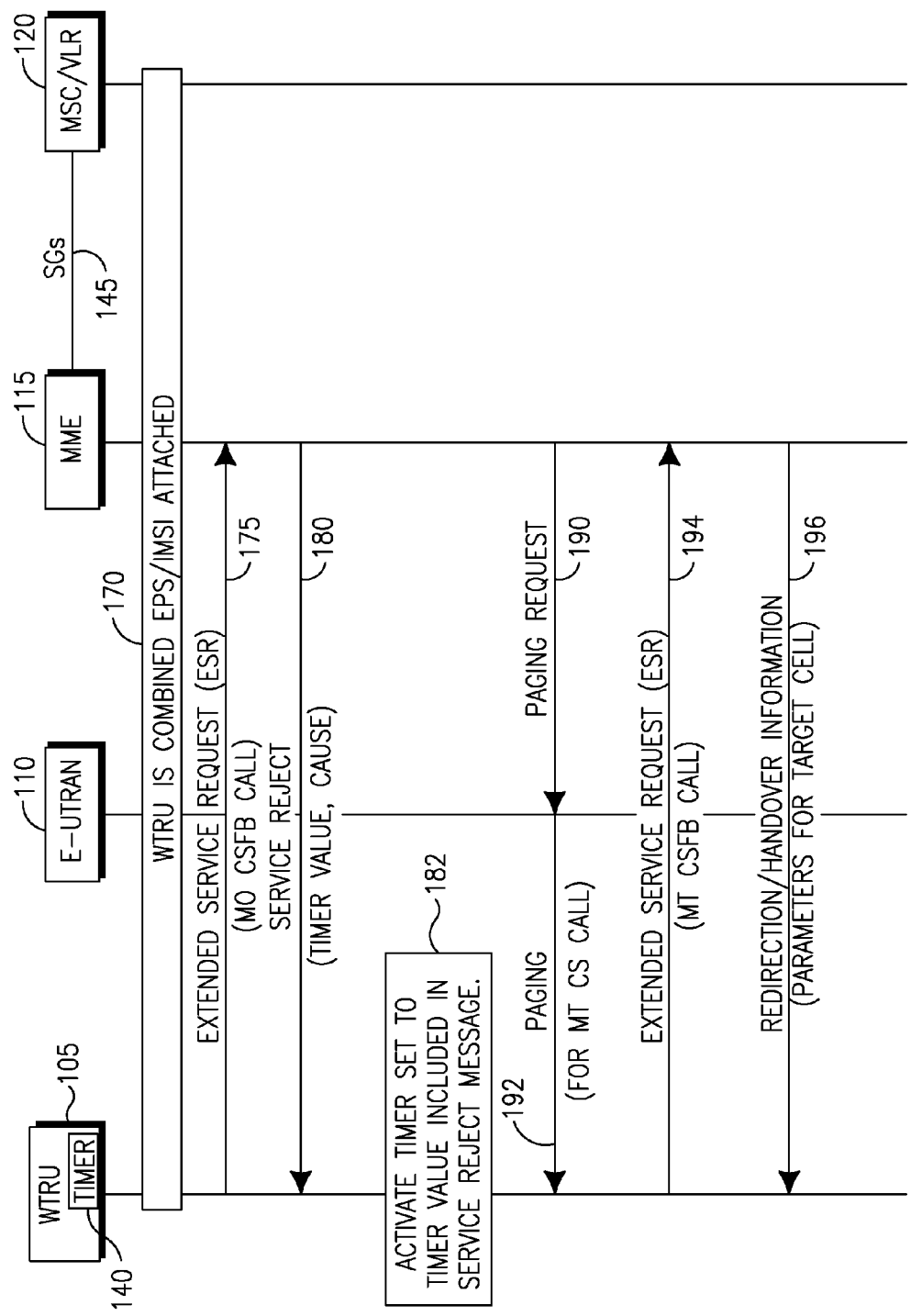

For the purpose of avoiding delays to placing emergency calls, when the WTRU 305 sends an ESR message for CSFB for emergency calls, the timer 325 (i.e., T3417ext) may have a shorter value than the 10 seconds used in the timer 140 of the WTRU 105 of FIG. 1B. For example, a value of 4 seconds may be used for a timer 325 in the WTRU 305 of FIG. 3. This allows the WTRU 305 to take other actions in case of the occurrence of a failure scenario that does not lead to a response from the network, e.g., continuous lower layer failure, MME reset, and the like. Thus, when this timer 325 expires, the WTRU 305 may autonomously reselect to the CS domain to place an emergency call. Alternatively, if the WTRU 305 is IMS capable and the network supports IMS emergency calls, the WTRU 305 may attempt to place an emergency call via IMS.

Alternatively, the value of the timer 325 may not be changed. However, the WTRU 305 may send another ESR message, even if it had sent one already. Thus, the WTRU 325 may send multiple ESR messages if it does not receive a response from the network, (i.e., either a service reject message or lower layer indication about success or failure of the ESFB request procedure), even if the timer 325 is still running. The time at which the WTRU 305 decides to send additional ESR messages may be implementation dependent or may be preconfigured in the WTRU 305. Note that the embodiments described above may also apply for cases of MO CSFB or MT CSFB that are not for emergency calls.

SMS transfer over the PS domain (e.g., LTE) may be performed by encapsulating an SMS message in NAS UL transfer and NAS DL transfer messages for the UL (MO) and DL (MT) respectively. The NAS layer in the PS domain may not perform retransmissions, even though it transmits the SMS messages. These retransmissions may be triggered by an SMS entity itself. Thus, no LTE NAS positive acknowledgement (ACK) messages exist to confirm the receipt of SMS. In some cases, the MSC/VLR 320 may reset and thus lose all the context of those WTRUs that had performed a combined registration to LTE and the CS domain. If the WTRUs are not informed, the continuous sending of SMS messages by a WTRU may keep failing. Moreover, since the MME 315 only re-encapsulates and relays SMS messages in both UL and DL, the MME 315 in this case may simply ignore the SMS message transfer request. Thus, if the WTRU 305 stays in the PS domain and the MSC/VLR 320 is still not running, the user may not be able to send/receive SMS messages.

For the purpose of knowing about a failure of the SGs interface 338, e.g., due to reset of the MSC/VLR 320, if the WTRU 305, after performing N transmissions/retransmissions of SMS messages, (where N is an integer), has not received an ACK, as per the SMS protocol, (i.e., contention period (CP)-ACK), it may stop the transmission of SMS (NAS UL transport) or ESR messages. Moreover, this may be used as a trigger for sending a combined TAU request in order for the WTRU 305 to be informed about the status of the SGs interface 338 by verifying the response from the network. Alternatively, the WTRU 305 may wait for the next periodic TAU procedure, and then send a combined TAU, instead of a TAU with an update type set to periodic. In addition, the WTRU 305 may resume the sending of SMS (UL NAS transport) or ESR messages if the WTRU 305 receives an MT SMS or MT CSFB request. In this case, the WTRU 305 may assume that the association of the SGs interface 338 is still valid and continue as normal.

Alternatively, the WTRU 305 may be informed via an attach accept or TAU accept message that the CS service/domain is temporarily not available, (e.g., due to congestion). The network may also include a timer value (i.e., T3442) in such messages to set a timer 325 in the WTRU 305. Thus, the WTRU 305 may be informed about this service/domain unavailability before sending an ESR message, and the WTRU 305 may take certain actions, e.g., display such indication to the user, or reselect to CS domain for emergency calls when requested by upper layers. The WTRU 305 may interpret the inclusion of the timer value in the attach/TAU accept message as if a service reject message has been received due to sending an ESR message, (e.g., the WTRU 305 may still respond to MT CSFB unless explicitly informed not to do so, e.g., for specific supplementary services or all, and the like). This may apply to all types of registration messages, including periodic TAU requests. Moreover, such indications may be provided to the WTRU 305 when it is in the CS domain (GERAN/UTRAN). Thus, if the WTRU 305 is informed that the MME 315 is performing congestion control, the user, (e.g., by making use of an indication from the WTRU 305), may choose to change the settings of the WTRU 305 such that the WTRU 305 remains in the CS domain. Alternatively, the WTRU 305 may decide to stay in the CS domain based on the WTRU settings, (e.g., if the WTRU 305 is voice centric and such indication is received, the WTRU 305 may stay in the CS domain until the congestion control is terminated, or until manual selection by the WTRU 305 causes a radio access technology (RAT) change to the PS domain (LTE), or until handover. An indication may be set for the termination of such control (in the PS domain) to a WTRU that is in the CS domain.

Figure 4:
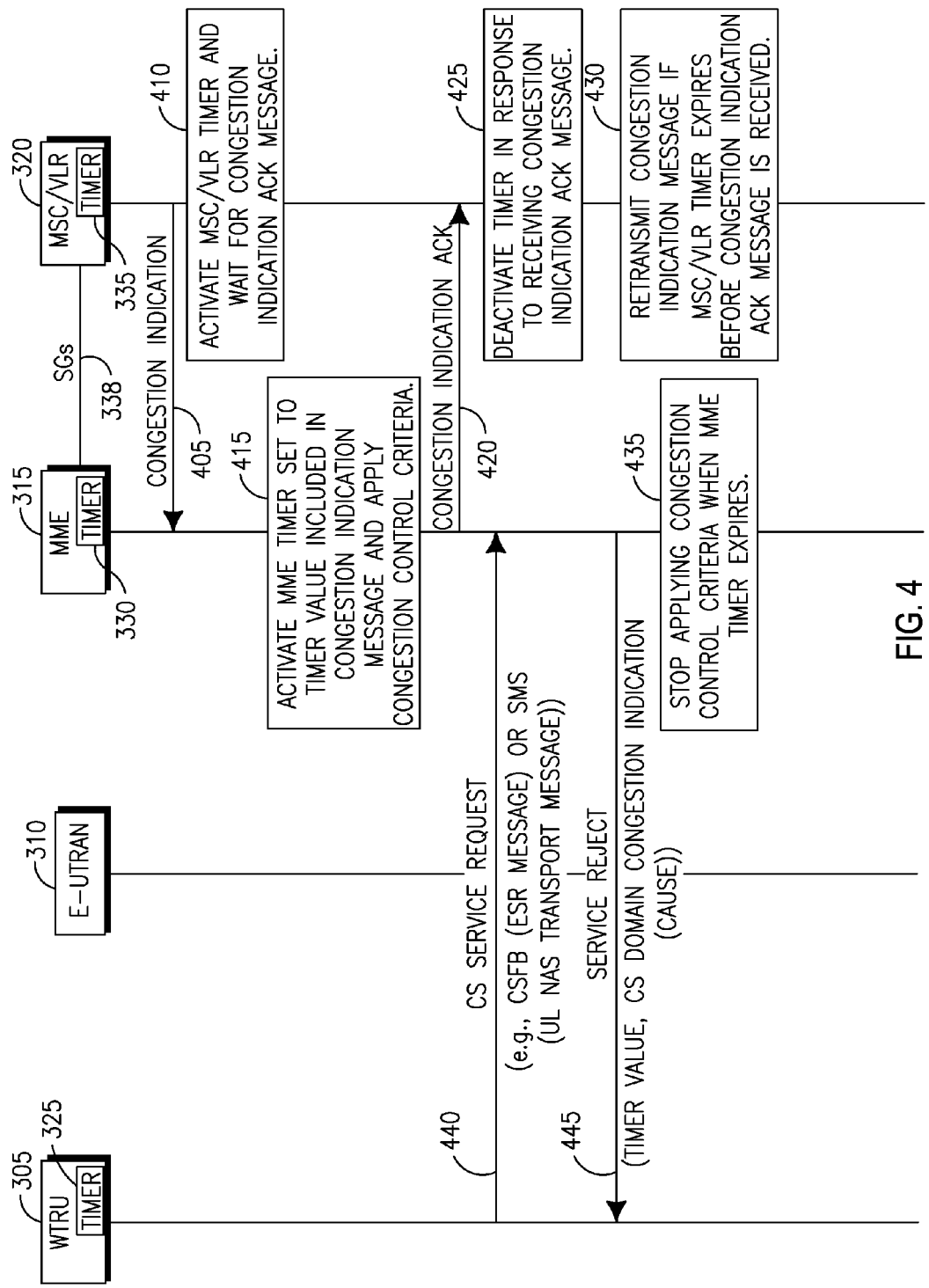

FIG. 4 is a signal flow diagram of a CSFB call establishment procedure in accordance with a third embodiment. The MSC/VLR 320 may send a congestion indication message (405) over the SGs interface 338 to start a congestion control procedure, and may optionally include a timer value to set the timer 330 in the MME 315, and the timer 325 in the WTRU 305, to guard from adding to the congestion. The MSC/VLR 320 may also activate a timer 335, set to a predetermined time period, during which it waits for a congestion indication ACK from the MME 315 (410). The MME 315 may activate the timer 330 set to a timer value included in the congestion indication message, and apply a congestion control criteria (415). If the MSC/VLR 320 receives a congestion indication ACK from the MME 315 (420), the timer 335 in the MSC/VLR 320 is deactivated (425). Otherwise, the MSC/VLR 320 may retransmit the congestion indication message if the timer 335 expires before the congestion indication ACK is received (430). When the timer 330 in the MME 315 expires, the MME 315 may stop applying the congestion control criteria (435).

During the time period that the congestion control criteria is applied, when a CS service request sent by the WTRU 305 is received by the MME 315 (440), a service reject message (445) is sent by the MME 315 to the WTRU 305. The service reject message may include a timer value to be used to set the timer 325 in the WTRU 305, and may also include a CS domain congestion indication (cause). The CS service request may be for CSFB (i.e., an ESR message), or for SMS (i.e., a UL NAS transport message).

The MSC/VLR 320 may indicate to the MME 315 if the congestion control criteria, (or CS domain availability status), may be applicable to CSFB (CS domain), or to both CSFB and SMS (PS domain). Moreover, the CSFB congestion control, (or CS domain availability status), may be applicable to CS calls only, location services only, supplementary services only, or any combination thereof. Thus, the MME 315 may allow CSFB if the congestion control, (or CS domain availability status) criteria is not met. For example, assuming that congestion control has been applied to CS calls only, the MT CSFB for LCS and SS may be allowed. In this case, the MSC/VLR 320 may include the related IEs in the paging message on the SGs interface 338 so that the MME 315 may realize that the paging is for other (non-CS calls) purposes.

Congestion control may be performed for a subset of WTRUs only, (e.g., WTRUs that are no longer allowed to access the CS domain based on some operator policy). Thus, the MSC/VLR 320 may indicate to the MME 315 the WTRUs for which access control may be preformed. This may be preformed by using the IMSI as the WTRU identity. Furthermore, CS domain availability control may be applied to WTRUs that are members of a certain closed subscriber group (CSG). For example, HeNBs may be deployed to serve WTRUs that do not support IMS services but are members of a particular CSG.

For the purpose of performing congestion control, if the WTRU 305 is informed about congestion, (e.g., the WTRU is provisioned with backoff congestion control/backoff timers, an EPS backoff, a NAS backoff timer, an access point network (APN) backoff timer, or any combination of timers), then the WTRU 305 may not send any NAS message that carries requests/messages that are specific to CS domain services or that are specific to an application that runs in the PS domain, (e.g., location services in LTE, (which use an LTE NAS message to exchange location service information—via UL/DL generic NAS transport)).

For example, if a WTRU 305 is informed about CS domain congestion, (e.g., the WTRU may be provided with a mobility management (MM) backoff timer value to set its timer 325, for example T3442 or any other well defined MM backoff timer value), while it is in the PS domain, then the following methods may be applicable. In an example method, if the WTRU 305 is registered for EPS, i.e., the WTRU's combined attach procedure may be accepted for EPS attach and the WTRU 305 may be provisioned with an MM backoff timer, (e.g., T3442 or any equivalent timer), then the WTRU 305 may not initiate another combined attach until the MM backoff timer, (or any other equivalent timer, e.g., T3442), expires. Exceptionally, if the WTRU 305 has a request for CS emergency calls, then the WTRU 305 may initiate a combined attach procedure. An exception to this rule may be a change in public land mobile network (PLMN), MME/SGSN, MSC/VLR or any combination.

For this purpose, the WTRU 305 may set the establishment cause to "emergency call" if it is initiating the combined attach procedure in idle mode. Note that the WTRU 305 may send a TAU message instead of an attach request message, (i.e., the methods apply to both attach and TAU messages).

If the WTRU 305 is already in connected mode and wants to send an attach request or a TAU message, then a new attach type or update type, (for attach or TAU procedures, respectively), may be defined such that the WTRU 305 may inform the MME 315 that there is an emergency call pending. For example, a new attach type may be defined to be "EPS/emergency IMSI attach", or a new update type may be defined, e.g., "normal EPS update/emergency IMSI attach". Thus, with this, the MME 315 knows that the WTRU 305 may be sending this message because there is a pending CS emergency call.

In addition, the MME 315 may accept the registration, (due to pending emergency call), and may also trigger the location update procedure towards the MSC/VLR 320 in order to register the WTRU 305 in the CS domain. Furthermore, the MME 315 may indicate in the location update towards the MSC/VLR 320 that the registration is for emergency purposes. This may be achieved by either defining a new update type or by including a new IE in the message towards the MSC/VLR 320.

The WTRU 305 may be configured as a low priority device, (or any other mode of operation that may be defined in future releases), and may include the device properties IE in the ESRs message it sends. As another option, the WTRU 305 may not include this IE in the ESR message if it is for an emergency call, (e.g., if the WTRU 305 is attempting to register to the CS domain for emergency calls as explained above). Similarly, the MME 315 may not include the device properties IE in a message sent to the MSC/VLR 320 if the WTRU 305 is performing a combined registration for the purpose of placing an emergency call. After the registration succeeds, the WTRU 305 does not need to send an ESR message to trigger CSFB. The MME 315 may autonomously, (i.e., without an explicit ESR from the WTRU for CSFB), take actions to execute CSFB for the WTRU 305 in question as if the ESR message was received from the WTRU 305. Thus, the MME 315 may choose to either perform PS handover (HO) or inform the E-UTRAN 310 to redirect the WTRU 305 by releasing its connection and provide redirection information. Redirection may be performed and, moreover, the MME 315 may signal high priority CSFB to the E-UTRAN 310 via S1 AP messages, (e.g., WTRU context modification messages with a CSFB indicator). The WTRU 305 may not deactivate any established bearers in the PS domain (i.e., LTE or UTRAN).

Alternatively, the WTRU 305 may directly/autonomously reselect to the CS domain upon request for a CS emergency call, (i.e., the WTRU 305 need not register, (perform combined registration in the PS domain via attach or TAU message), to the CS domain via the PS domain. Upon reselection, the WTRU 305 may register in the CS domain and follow the procedures as expected, (as if the WTRU 305 was already in the CS domain).

If a WTRU 305 is in the CS domain, (i.e., the WTRU 305 was either already in the CS domain or performed a reselection to the CS domain), (autonomously or as commanded by the network, or has performed an inter-system change to the CS domain), and is running an MM backoff timer or any equivalent timer, then upon request for an emergency call, the WTRU 305 may indicate in the attach message that the reason for this registration is an emergency call, (if the WTRU 305 is not already registered), e.g., by defining a new attach type, such as "emergency IMSI attach".

Moreover, since the WTRU 305 was running a backoff timer, the WTRU 305 may consider itself emergency attached for the duration of the emergency call. The WTRU 305 may save the value of the backoff timer running when it is stopped, so that after the emergency call is terminated, the WTRU 305 may resume the timer either from its saved value or a portion of it and behaves according to the rules expected when such timer is running, (e.g., the WTRU 305 may not send MO CS related signaling/CS data requests, and the like). This may be applicable to the PS domain, (e.g., LTE or E-UTRAN), i.e., if the MO CS-related signaling may be performing an emergency attach for emergency bearer services while there is any NAS, PS or CS specific, or an APN specific backoff timer running, the WTRU 305 may not stop and reset the timer during the emergency call. As another option, the WTRU 305 may keep running the timer during the lifetime of the emergency call as usual. Note that these methods may apply to both CS and/or PS emergency call/service.

In another method, if the WTRU 305 may already be registered for EPS/IMSI, (i.e., to both the PS and CS domains), but the WTRU 305 is already running an MM backoff timer, (or any equivalent timer, e.g., T3442), then the WTRU may not send any request for CSFB, (except for emergency calls), and may also not send any SMS messages via a UL NAS TRANSPORT (LTE NAS) message. The following may be used in any combination.

The WTRU 305 may not send another combined registration unless at least one of the PLMN, the MSC/VLR 320 or the MME 315 has changed.

The MME 315 or the MSC/VLR 320 may also inform the WTRU 305 about whether or not the SGSN is congested. If the SGSN is not congested, (or if the WTRU 305 has no information about SGSN congestion), then the WTRU may autonomously reselect to PS domain (GERAN 125/UTRAN 130) to perform SMS transfer via the SGSN. Alternatively, the MME 315/E-UTRAN 310 may redirect the WTRU 305 to the PS domain to perform SMS via the SGSN. Such an indication may also be provided to the WTRU 305 via RRC messaging, (e.g., RRC connection release).

The WTRU 305 may use a new establishment cause when transitioning to connected mode to inform the MME 315 that the purpose of this transition is for SMS since the initial NAS message sent in the PS domain is a service request message or an ESR message, both of which do not provide any such indications. Also, if the ESR message is to be used, the WTRU 305 may use a new service type for this purpose. Alternatively, the WTRU 305, (optionally only for low priority devices or other mode of operation), may be allowed to send the UL NAS TRANSPORT message as the initial NAS message.

The WTRU 305, upon either reselection or inter-system change or PLMN change, and the like, may indicate to the new/target node, (e.g., the MME 315, or SGSN, or MSC/VLR 320), that the previous nodes to which it was either registered, (or the last nodes that it contacted, e.g., MME 315, or MSC/VLR 320, or SGSN, or any combination), had applied congestion control for the WTRU 305 in question. The recipient node may avoid contacting the indicated nodes and the current serving node may contact a home subscriber service (HSS) directly for any subscriber related information.

In some cases, there are no triggers for the WTRU 305 to perform either a combined attach or a combined TAU, and the WTRU 305 may already be registered to both the CS and PS domains. Thus, due to the existence of a successful combined registration, the WTRU 305 may send SMS messages via the PS domain, (using the UL NAS TRANSPORT message). The expected behavior of the MME 315 is to forward the encapsulated contents, (i.e., SMS message), of this NAS message to the MSC/VLR 320. However, the MSC/VLR 320 may desire, (at that point or any point in time before the transmission of the SMS by the WTRU 305), to apply congestion control for the WTRU 305 in question, (or a subset of WTRUs). Thus, to achieve this functionality, the following methods may be used.

The MSC/VLR 320 need not wait for the WTRU to perform a combined registration, (i.e., the MSC/VLR need not wait for a location update request from the MME via the SGs interface 338), before indicating congestion control. Thus, the MCS/VLR may at any point indicate to the MME that congestion control may be performed for a WTRU or subset of WTRUs, (that may be identified uniquely either by IMSI or any other identification), optionally with a signaled timer for each WTRU, or a preconfigured congestion control timer may be used by the MME 315. Thus, the MME 315 may then forward such an indication to the WTRUs via either NAS or RRC messages, and also forward the necessary backoff timer values that the WTRUs may apply to their timers.

Moreover, if the MME 315 is informed to perform congestion control for at least one WTRU 305, or based on any operation and maintenance configuration or policy, the MME 315, upon reception of a NAS uplink transport message, should not simply discard the message but may also respond to the WTRU 305 via a new or existing NAS message, (e.g., EPS mobility management (EMM) information request), and inform the WTRU 305 that there is congestion at the MSC/VLR 320, (or any other node that is related to the associated service), and provide the necessary backoff timer value to the WTRU 305. Upon reception of this timer value, the WTRU 305 may not send any SMS requests or requests for any CS services, e.g., CSFB, for the duration of the backoff timer 325. Moreover, the WTRU 305 may not autonomously reselect to the CS domain to request any CS service except if the service is an emergency call. Note that the methods above may also be applied to the SGSN and the MSC/VLR 320 via the Gs interface and any equivalent message that may be used in the UTRAN, (e.g., a global media mobility (GMM) information message may be sent from the SGSN to the WTRU 305 to inform it about MSC/VLR 320 congestion).

The SGSN or the MSC/VLR 320 may also inform the WTRU 305, when the WTRU 305 is in the CS domain about any congestion in the MME. The knowledge at the SGSN or MSC/VLR 320 about MME 315 congestion may be implementation specific. Alternatively, the MME 315 may inform the SGSN and/or the MSC/VLR 320 via appropriate interfaces, (e.g., SGs interface 338 for communication between the MME 315 and the MSC/VLR 320), about congestion at the MME 315. This indication may be a general indication such that all WTRUs are provided with EMM specific backoff timers, or the indication may be for a set of at least one WTRU 305 which may then be provided with the related backoff timer value by the SGSN and/or the MSC/VLR 320. The MME 315 may also indicate the necessary backoff timer value to the WTRU 305.

Upon reception of such a backoff timer value, the WTRU 305 may avoid reselection to the PS domain or, if the WTRU 305 reselect to the PS domain, the WTRU 305 may not initiate any MO signaling or data requests.

For the purpose of knowing whether certain NAS messages have been correctly processed or not, the following methods may be used. In a method, every UL NAS transport message, DL transport NAS message, generic UL NAS transport message, or generic DL NAS transport message, may have a response message from the recipient. Currently, the recipient node, e.g., when the MME 315 receives the UL NAS transport message, only forwards the contents to an appropriate node, e.g., the MSC/VLR 320, depending on the content of the NAS message, e.g., SMS. Alternatively, the MME 315 may discard the message if there is a problem with the node to which the contents should be forwarded. With this behavior, the WTRU 350 may not know that the message was discarded, and the SMS entity in the WTRU 305 may trigger retransmission of the SMS, and the MME 315 may discard the message. The above mentioned messages may have a response to the node that sent the message. The response may be sent at all times and may be in the form of a new NAS message, or an existing message may be used. In either case, a cause code may be used to indicate the success or failure of the processing at the recipient node. For example, if the WTRU 305 sends an SMS via an UL NAS TRANSPORT message, the MME 315 may respond with another message to indicate the outcome, e.g., "message correctly processed", or "SGs interface down", and the like. These are examples and do not limit the outcomes or processing results and cause codes that may be used by the recipient, (MME 315 in this example).

Alternatively, the response may be sent when there is failure in the processing at the recipient node. For example, if the WTRU 305 receives a DL NAS TRANSPORT message from the MME 315, and an error occurs such that the contents cannot be sent to the WTRU 305, the WTRU 305 may send a response to the MME 315 to indicate the failure. This may also apply to the UL/DL generic NAS transport message, and the recipient of a message may always, or upon failure to process a message, respond to the sender with another message, (new or existing), and a cause code to indicate the failure. The recipient may also indicate to the intended application, (e.g., the MME 315 informs the WTRU 305 about the failure of a message).

The same methods may apply to nodes, such as the MME 315 and the MSC/VLR 320, i.e., such responses may be used to indicate to the sender whether the processing of a received message was successful or not. For example, if the MME 315 fails to forwards an SMS message that was sent by the MSC/VLR 320 over the SGs interface 338, then the MME 315 may indicate this to the MSC/VLR 320 with either a new SGs message, an existing message and an appropriate cause. The same may apply for any interaction between the MSC/VLR 320 and the SGSN, or the SGSN and the MME 315, or any combination.

Alternatively, the response may be sent as per operator configurations, (e.g., when there is failure, or when there is congestion, or any combination). For example, the MME 315 may also include a cause code to explain the reason for not processing an UL NAS TRANSPORT message from the WTRU 305, e.g., congestion at the MSC/VLR 320, and the like. Moreover, the MME 315 may provide a backoff timer value to the WTRU 305, during which the WTRU 305 may not send SMS requests, (i.e., UL NAS TRANSPORT message), and/or any CSFB requests.

For the response messages proposed above, the recipient node may discard a response, (or report message), if the security check fails, (e.g., if the integrity check fails. For example, the WTRU 305 may discard a response, (to an UL NAS TRANSPORT message), from an MME 315 if the security check, e.g., integrity check, fails at the WTRU 305. Thus the WTRU 305 may send another SMS, (or any other CS service related request), until it receives a reject and the security check succeeds.

The MME 315 may indicate to the MSC/VLR 320 that it is congested and that the MSC/VLR 320 may start congestion control. This indication may be for one or more WTRUs 305, and may be initiated by the MME 315 for all WTRUs that are combined registered. Alternatively, the MME 315 may send this indication upon a request from the MSC/VLR 320 to either page the WTRU 305 for CSFB, or when the MSC/VLR 320 sends an SMS message for a WTRU 305, or when the MSC/VLR 320 initiates any SGs procedure with the MME 315. The MME 315 may provide the MSC/VLR 320 with a backoff timer value during which the MSC/VLR 320 may not forward any message towards the MME 315, or may not initiate any SGs procedure towards the MME 315, for at least one WTRU 305. These methods may apply in the other direction, i.e., if informed about congestion, the MME 315 may not initiate any SGs procedure towards the MSC/VLR 320 for at least one WTRU 305. The same methods also apply for the MME 315 and the SGSN, or the MSC/VLR 320 and the SGSN, or any combination.

If the MME 315 is providing the WTRU 305 with an MM, (or any equivalent), backoff timer value via a response to, as an example, the UL NAS TRANSPORT message, (or other messages that are proposed to have responses), then the MME 315 may also include a backoff timer value for general NAS congestion at the MME 315, APN congestion, congestion of the SGSN, the MSC/VLR 320, and the like. Thus, any core network (CN) node may always provide congestion related information about a multiple set of other CN nodes, simultaneously, using NAS or RRC messaging. For example, the MME 315 may use an EMM information request message in response to an UL NAS TRANSPORT message that was discarded due to MSC/VLR 320 congestion. In this message, the MME 315 may provide general congestion control information, e.g., congested nodes, backoff timer values, and the like, to the WTRU 305.

Exceptions to the described methods or rules may be a change of PLMN, setting in the WTRU 305, MME 315, MSC/VLR 320, SGSN, tracking area identity (TAT), routing area identity (RAI), location area identity (LAI), and the like. The methods may also apply for the case when the WTRU may be roaming. Alternatively, the visited PLMN (VPLMN) may either request the home PLMN (HPLMN) for information on how to process requests from this WTRU, (e.g., if to apply congestion), or it may use its own policies to decide, e.g., if congestion control is to be applied to at least one WTRU 305.

Figure 5:
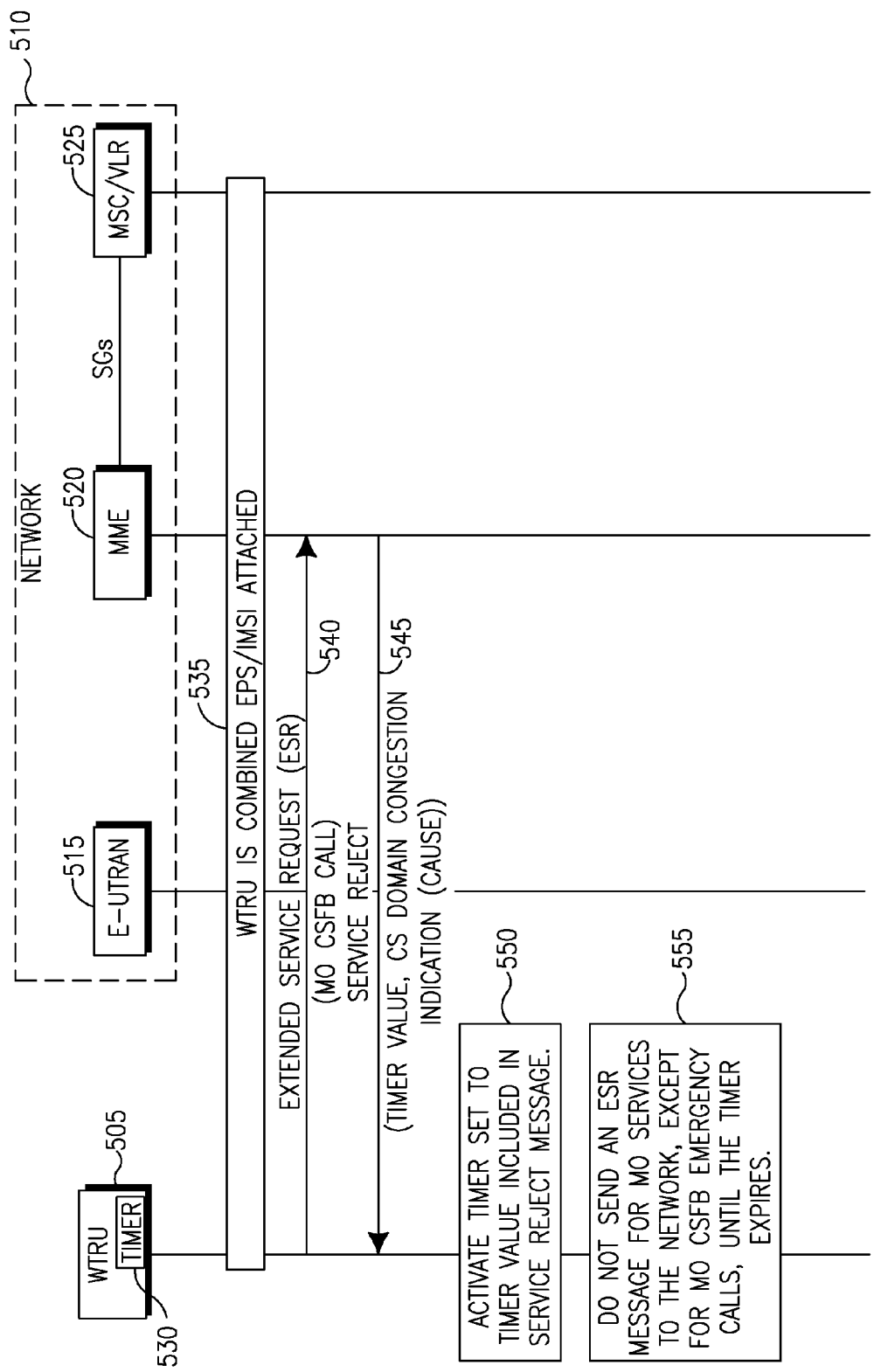

FIG. 5 is a signal flow diagram of a CSFB call establishment procedure performed in accordance with a fourth embodiment, whereby access to the CS domain is temporarily restricted due to congestion or the implementation of an operator policy. As shown in FIG. 5, a WTRU 505 communicates with a network 510 including an E-UTRAN 115, an MME 520 and a MSC/VLR 525. The WTRU 505 may include at least one timer 530. When the WTRU 505 is registered to both the PS and CS domains after sending an attach or TAU message, the WTRU 505 is combined EPS/IMSI attached (535). The WTRU 505 may initiate a CSFB request procedure by sending an MO CSFB ESR message (540) to the MME 520. Due to the temporarily restricted access to the CS domain, the MME 520 may send a service reject message (545) to the WTRU 505 to indicate, using a cause value, (e.g., #39), that the CS domain will temporarily not be available for a predetermined period of time, as defined by a timer value in the service reject message (545). The timer 530, (i.e., T3442), in the WTRU 505 may be set based on the timer value included in the service reject message and activated (550). The WTRU 505 may not send an ESR message for MO services to the network 510, except for MO CSFB emergency calls, until the timer expires (555).

Figure 6:
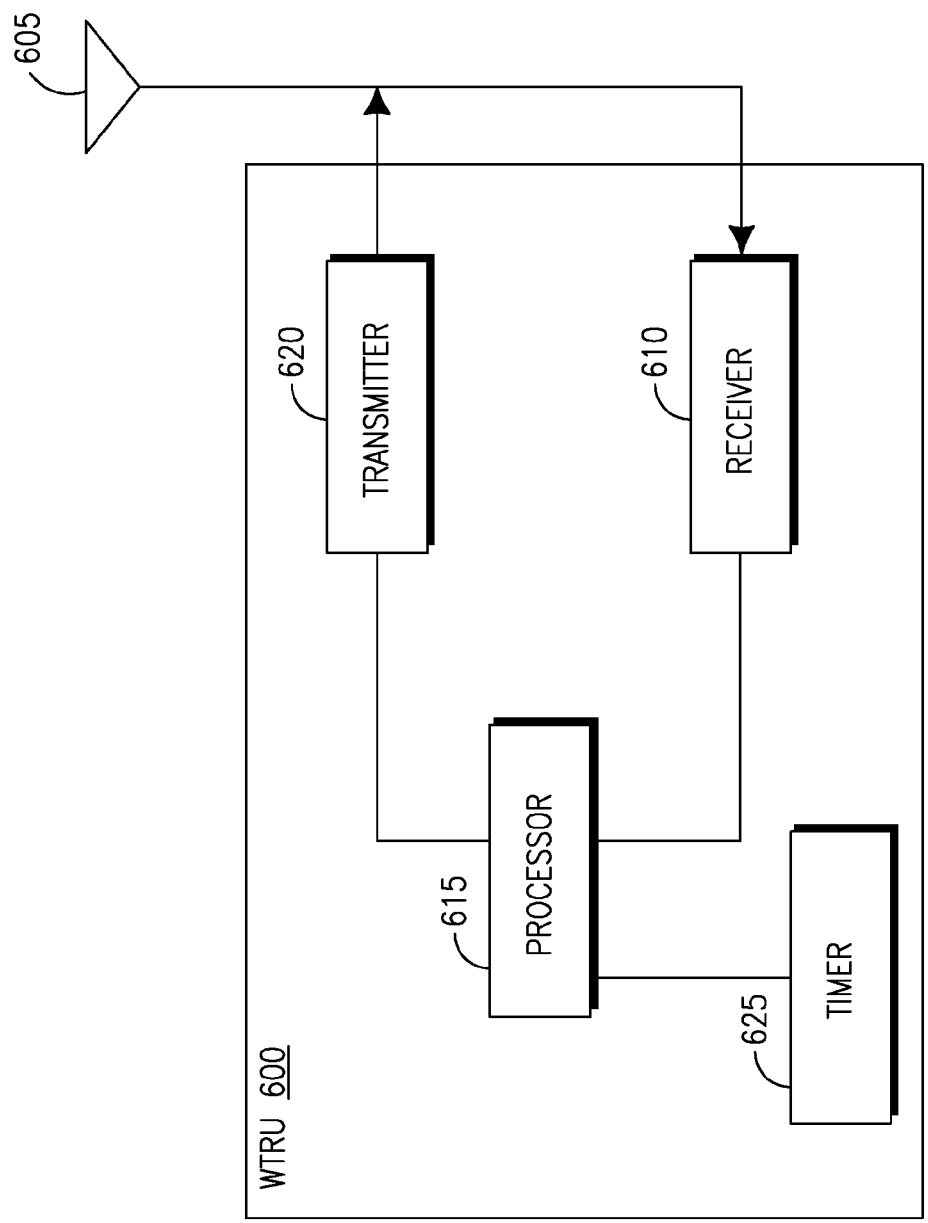
FIG. 6 is a block diagram of a WTRU configured in accordance with the procedures of FIGS. 3-5.

FIG. 6 is a block diagram of a WTRU 600 configured in accordance with the procedures of FIGS. 3-5. The WTRU 600 may include at least one antenna 605, a receiver 610, a processor 615, a transmitter 620 and at least one timer 625. The receiver 610 may be configured to receive, via the antenna 605, a service reject message including a timer value. The processor 615 may be configured to set the timer 625 based on the timer value, and activate the timer 625. The processor 615 may be further configured to not attempt to send ESR messages to a network for requesting MO services, except for MO CS fallback for emergency calls, until the timer 625 expires. The receiver 610 may be further configured to receive, via the antenna 605, paging for an MT CS call. The processor 615 may be further configured to deactivate the timer 625 in response to the receiver 610 receiving the paging. The transmitter 620 may be further configured to send an ESR message for an MO CS fallback call. The service reject message may be received by the receiver 610 in response to the transmitter 620 sending the ESR message. The transmitter 620 may be configured to send, via the antenna 605, an ESR message for an MT CS fallback call in response to the processor 615 deactivating the timer 625. The receiver 610 may be configured to receive at least one of redirection and handover information via the antenna 605.

Figure 7:
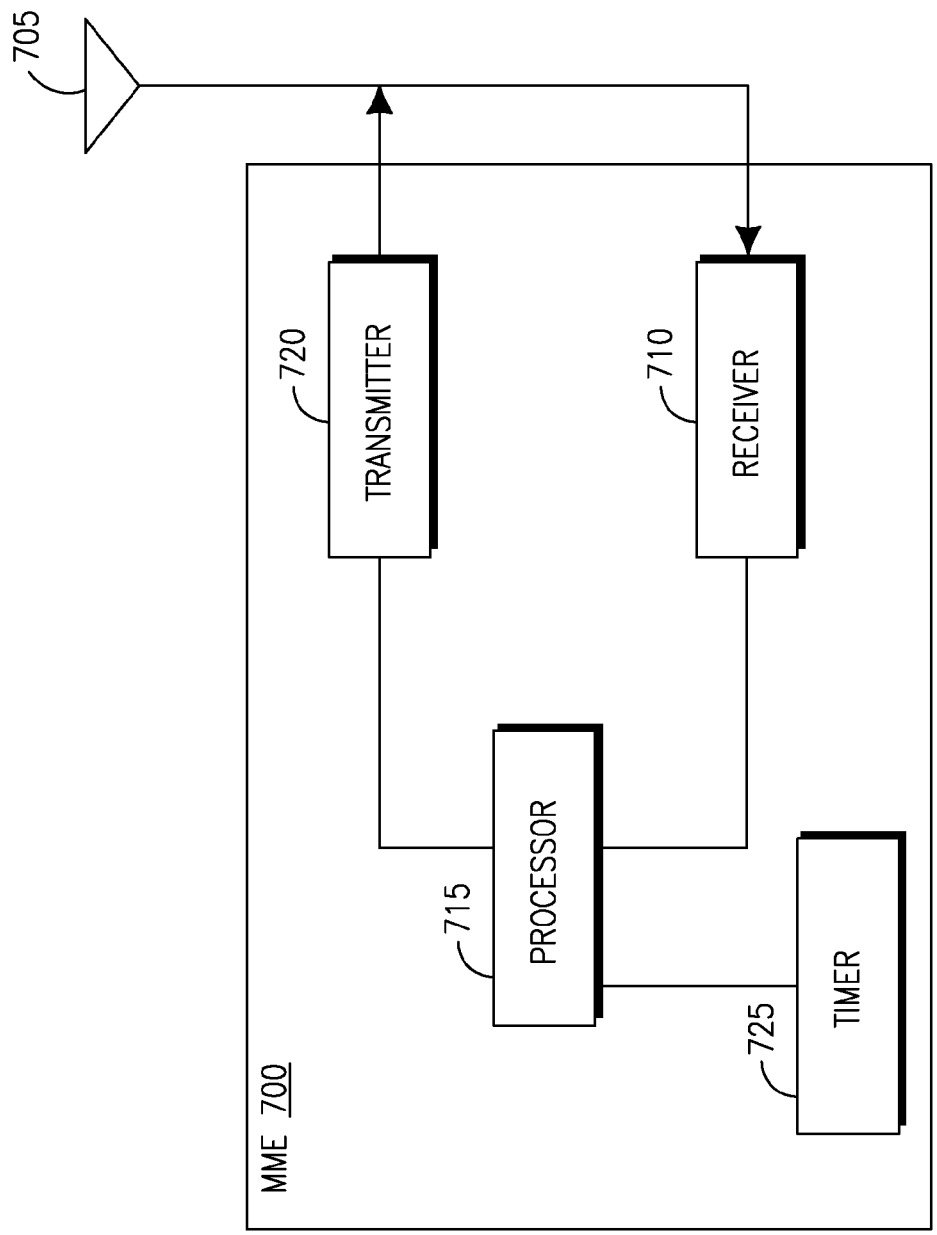
FIG. 7 is a block diagram of an MME configured in accordance with the procedures of FIGS. 3-5.

FIG. 7 is a block diagram of an MME 700 configured in accordance with the procedures of FIGS. 3-5. The MME 700 may include at least one antenna 705, a receiver 710, a processor 715, a transmitter 720 and at least one timer 725. The receiver 710 may be configured to receive, via the antenna 705, a congestion indication message including a timer value. The processor 715 may be configured to set the timer to the timer value, activate the timer 725, apply a congestion control criteria while the timer 725 is activated, and stop applying the congestion control criteria upon expiry of the timer 725. The transmitter 720 may be configured to transmit, via the antenna 705, a service reject message in response to any CS service requests received while the congestion control criteria is applied.

Figure 8:
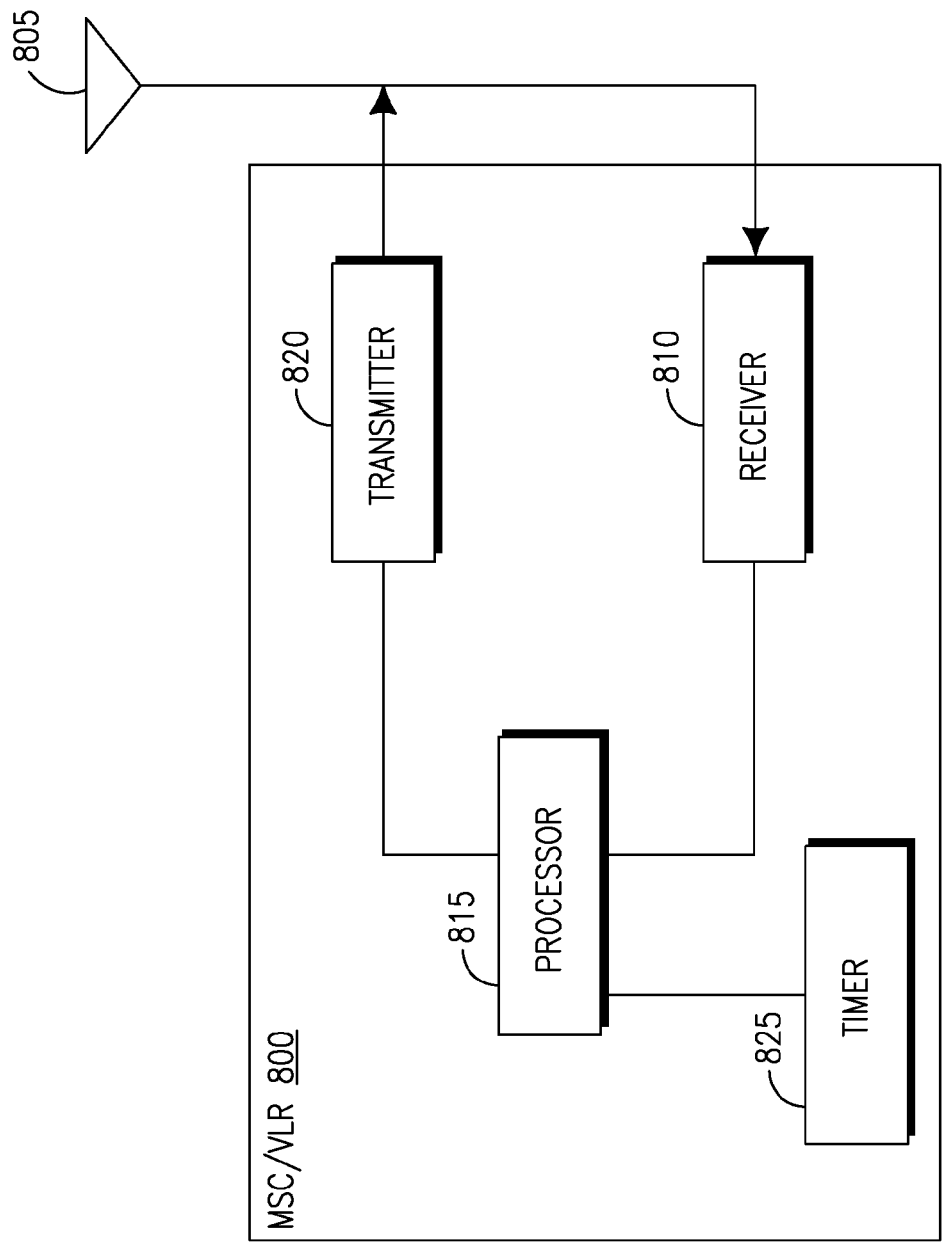
FIG. 8 is a block diagram of an MSC/VLR configured in accordance with the procedures of FIGS. 3-5.

FIG. 8 is a block diagram of an MSC/VLR 800 configured in accordance with the procedures of FIGS. 3-5. The MSC/VLR 800 may include at least one antenna 805, a receiver 810, a processor 815, a transmitter 820 and at least one timer 825. The transmitter 820 may be configured to transmit, via the antenna 805, a congestion indication message including a timer value. The processor 815 may be configured to set the timer 825 to the timer value, activate the timer 825, wait for the receiver 810 to receive via the antenna 805 a congestion indication ACK, deactivate the timer 825 on a condition that the congestion indication ACK is received, and control the transmitter 820 to retransmit the congestion indication message, via the antenna 805, on a condition that the timer 825 expires before the congestion indication ACK is received by the receiver 810.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a timer;
   a receiver configured to receive a message that includes a timer value; and
   a processor configured to:
      set the timer based on the timer value,
      activate the timer, and
      attempt mobile-originated (MO) circuit switched fallback (CSFB) for an emergency call during a period that corresponds to the timer value and during which MO CSFB is otherwise prohibited.

2. The WTRU of claim 1, further comprising a transmitter configured to transmit an extended service request (ESR) for an MO CSFB emergency call during the period that corresponds to the timer value.

3. The WTRU of claim 1, further comprising a transmitter configured to transmit an ESR for MO CSFB, wherein the message that includes the timer value is a service reject message received in response to the ESR.

4. The WTRU of claim 3, wherein the service reject message includes an evolved packet system mobility management (EMM) cause value that indicates that CS service is temporarily unavailable.

5. The WTRU of claim 1, wherein the timer value is a value for timer T3442.

6. The WTRU of claim 1, further comprising an antenna, operatively connected to the receiver, configured to receive radio frequency (RF) signals.

7. A method, performed in a mobility management entity (MME), the method comprising:
   receiving an extended service request (ESR) for mobile-originated (MO) circuit switched fallback (CSFB) via a wireless network;
   generating a service reject message that includes a timer value for setting a timer in a wireless transmit/receive unit (WTRU), wherein the timer value corresponds to a period during which MO CSFB, except for MO CSFB for emergency calls, is prohibited; and
   sending the service reject message.

8. The method of claim 7, further comprising receiving and accepting an ESR for MO CSFB for an emergency call during the period corresponding to the timer value.

9. The method of claim 7, wherein the generating the service reject message further comprises including an evolved packet system mobility management (EMM) cause value in the service reject message that indicates that CS service is temporarily unavailable.

10. The method of claim 7, wherein the timer value is included in a T3442 timer value information element (IE).

11. A wireless network comprising:
    a wireless transmit receive unit (WTRU) configured to generate and transmit an extended service request (ESR) for mobile-originated (MO) circuit switched fallback (CSFB) via a wireless network; and
    a mobility management entity configured to generate and send a service reject message that includes a timer value for setting a timer in the WTRU, wherein the timer value corresponds to a period during which MO CSFB, except for MO CSFB for emergency calls, is prohibited,
    wherein the WTRU is further configured to generate and transmit an ESR for an MO CSFB emergency call during the period during which MO CSFB, except for MO CSFB for emergency calls, is prohibited.

12. The wireless network of claim 11, wherein the service reject message includes an evolved packet system mobility management (EMM) cause value that indicates that CS service is temporarily unavailable.

13. The wireless network of claim 11, wherein the timer value is a value for timer T3442.

* * * * *